March 3, 1959     F. W. HOBAN     2,875,878
VENDING MACHINES
Filed July 26, 1952     8 Sheets-Sheet 1
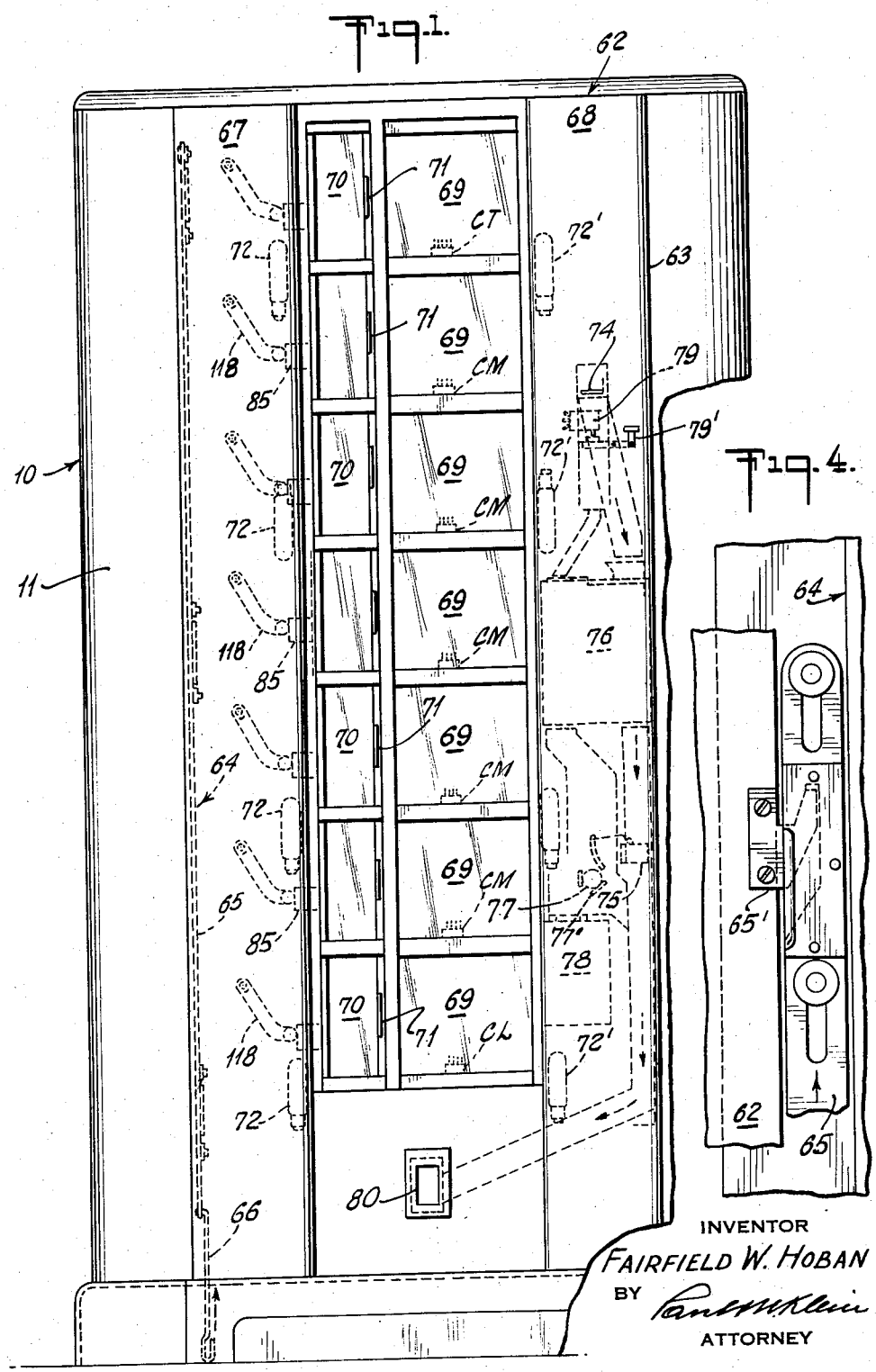
INVENTOR
FAIRFIELD W. HOBAN
BY
ATTORNEY March 3, 1959 F. W. HOBAN 2,875,878
VENDING MACHINES
Filed July 26, 1952 8 Sheets-Sheet 2
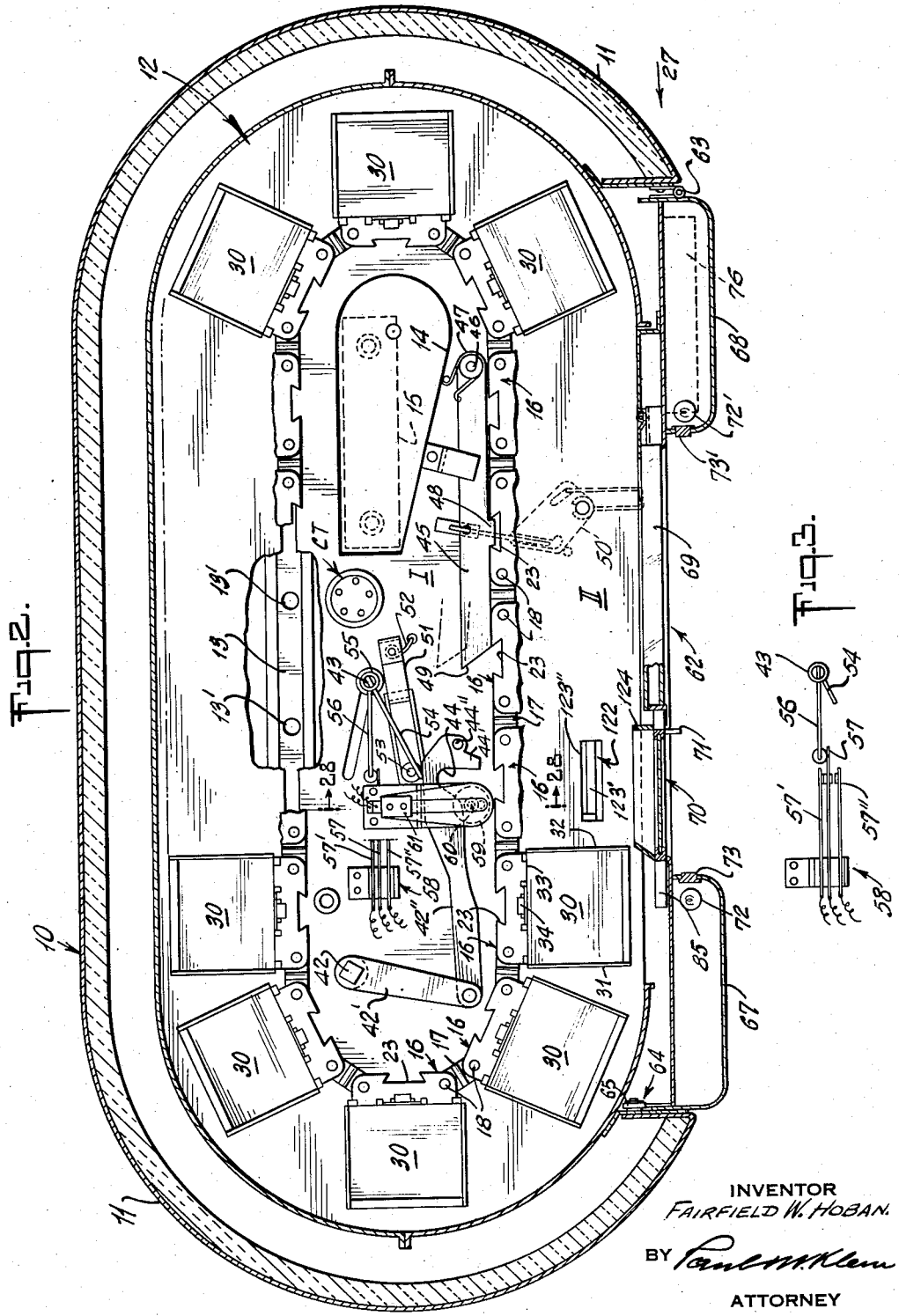
INVENTOR
FAIRFIELD W. HOBAN.
BY
ATTORNEY

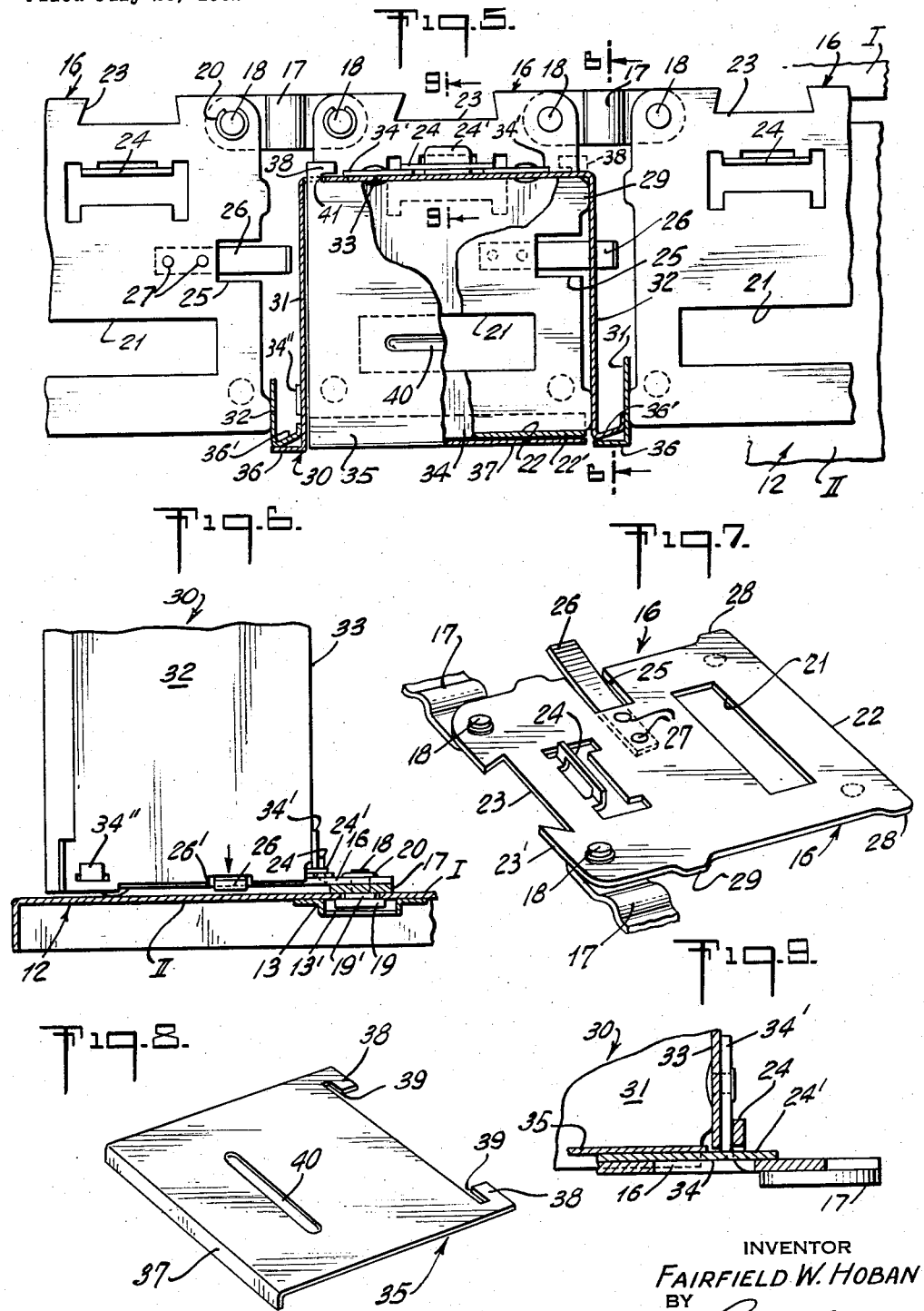

March 3, 1959 F. W. HOBAN 2,875,878
VENDING MACHINES
Filed July 26, 1952 8 Sheets-Sheet 4
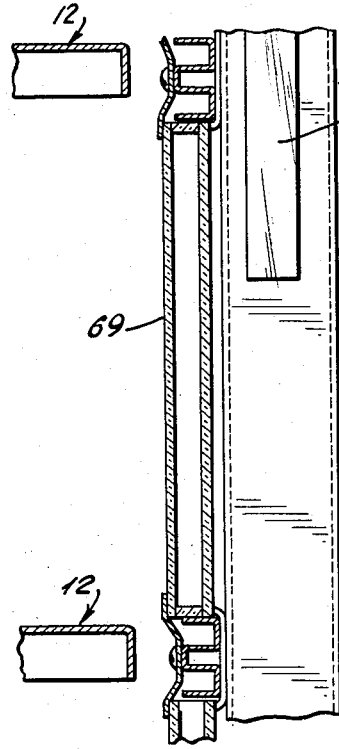
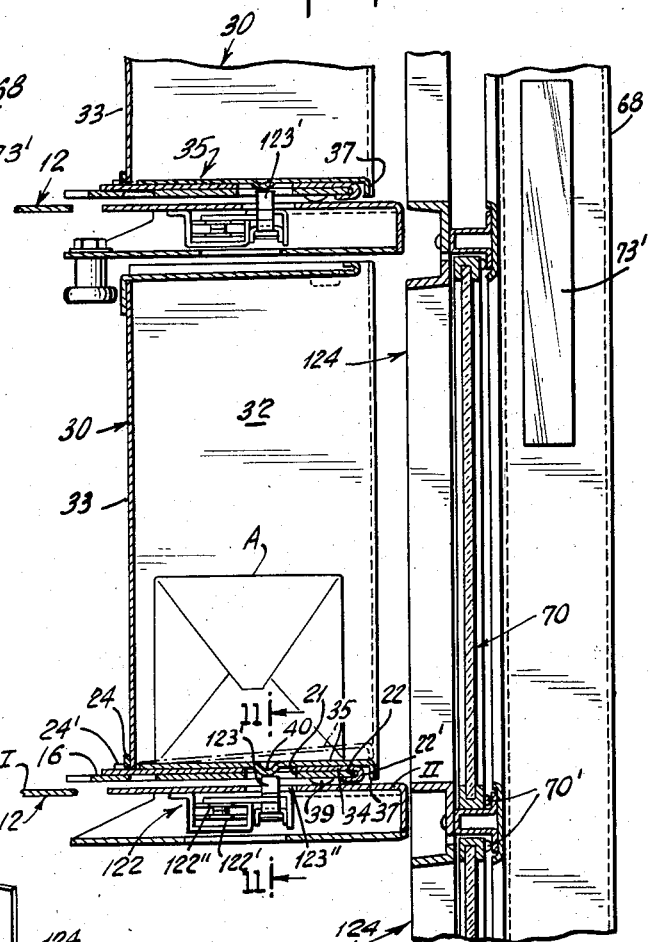
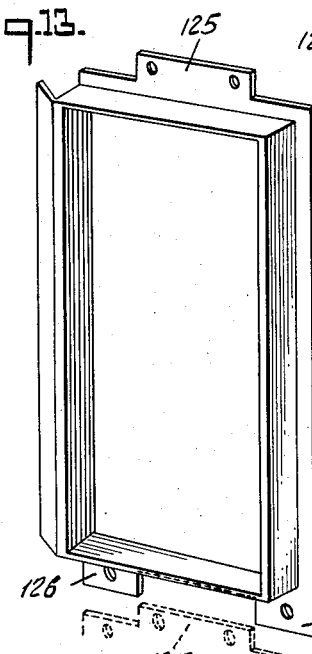
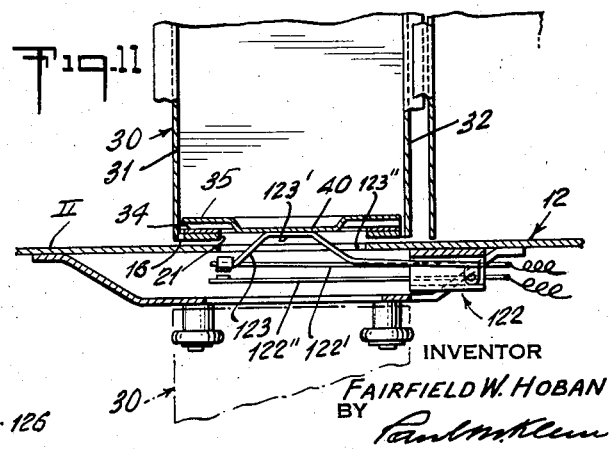
INVENTOR
FAIRFIELD W. HOBAN
BY
ATTORNEY March 3, 1959  F. W. HOBAN  2,875,878
VENDING MACHINES
Filed July 26, 1952  8 Sheets-Sheet 5
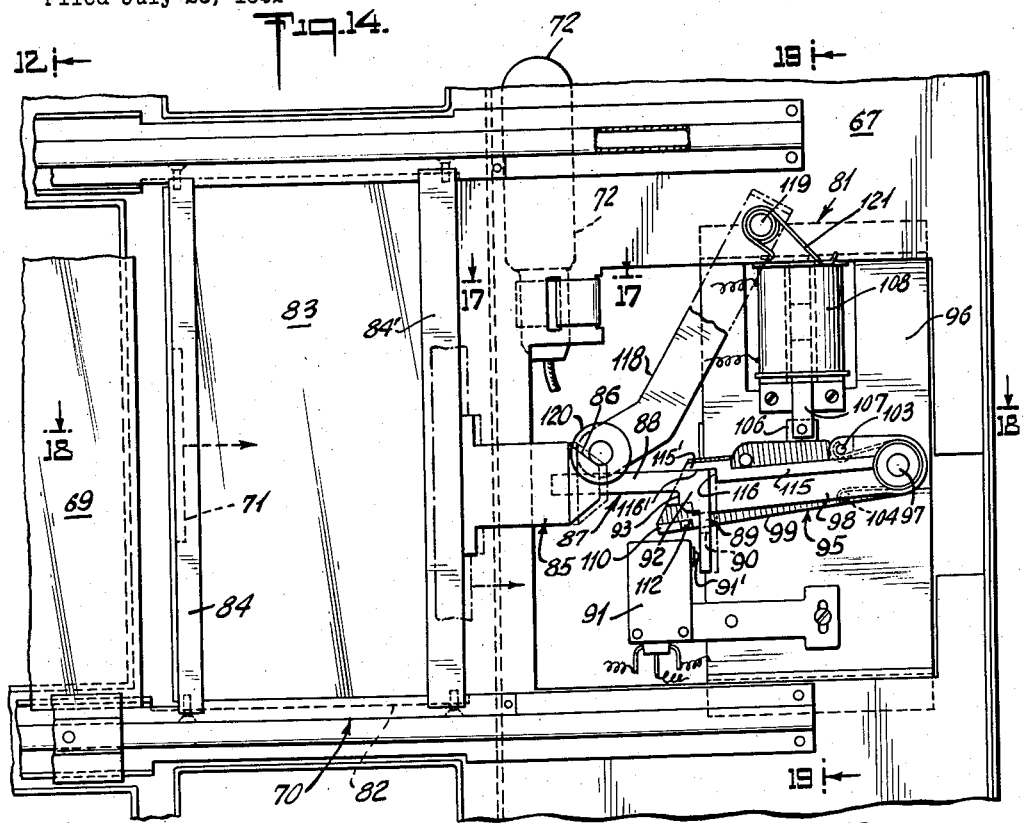
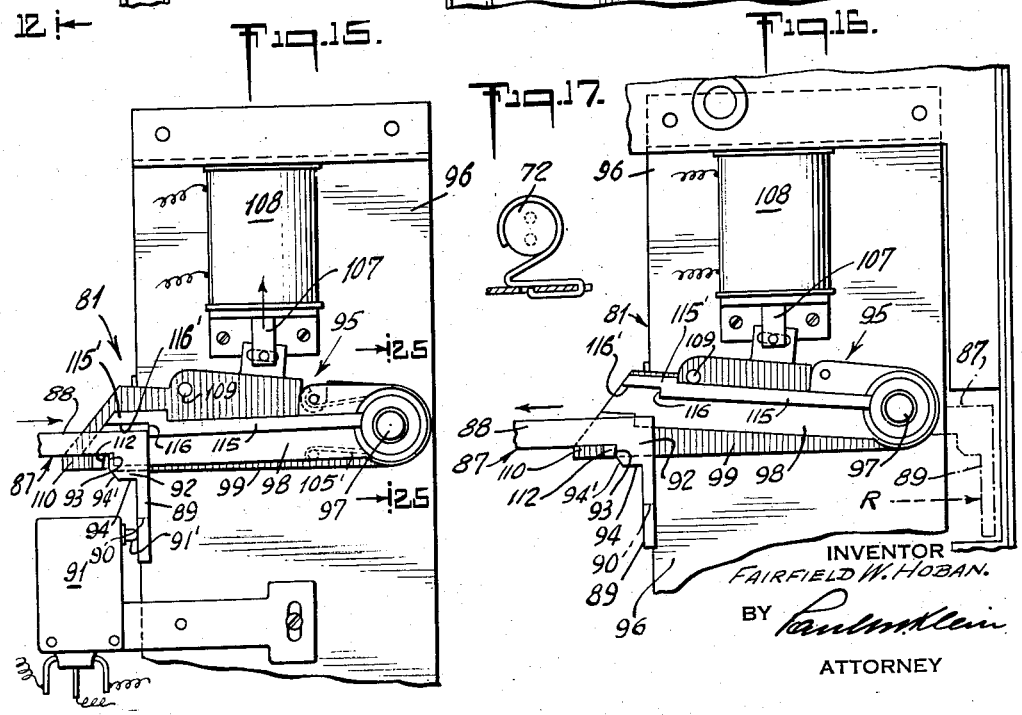
INVENTOR
FAIRFIELD W. HOBAN.
BY
ATTORNEY March 3, 1959  F. W. HOBAN  2,875,878
VENDING MACHINES
Filed July 26, 1952  8 Sheets-Sheet 6
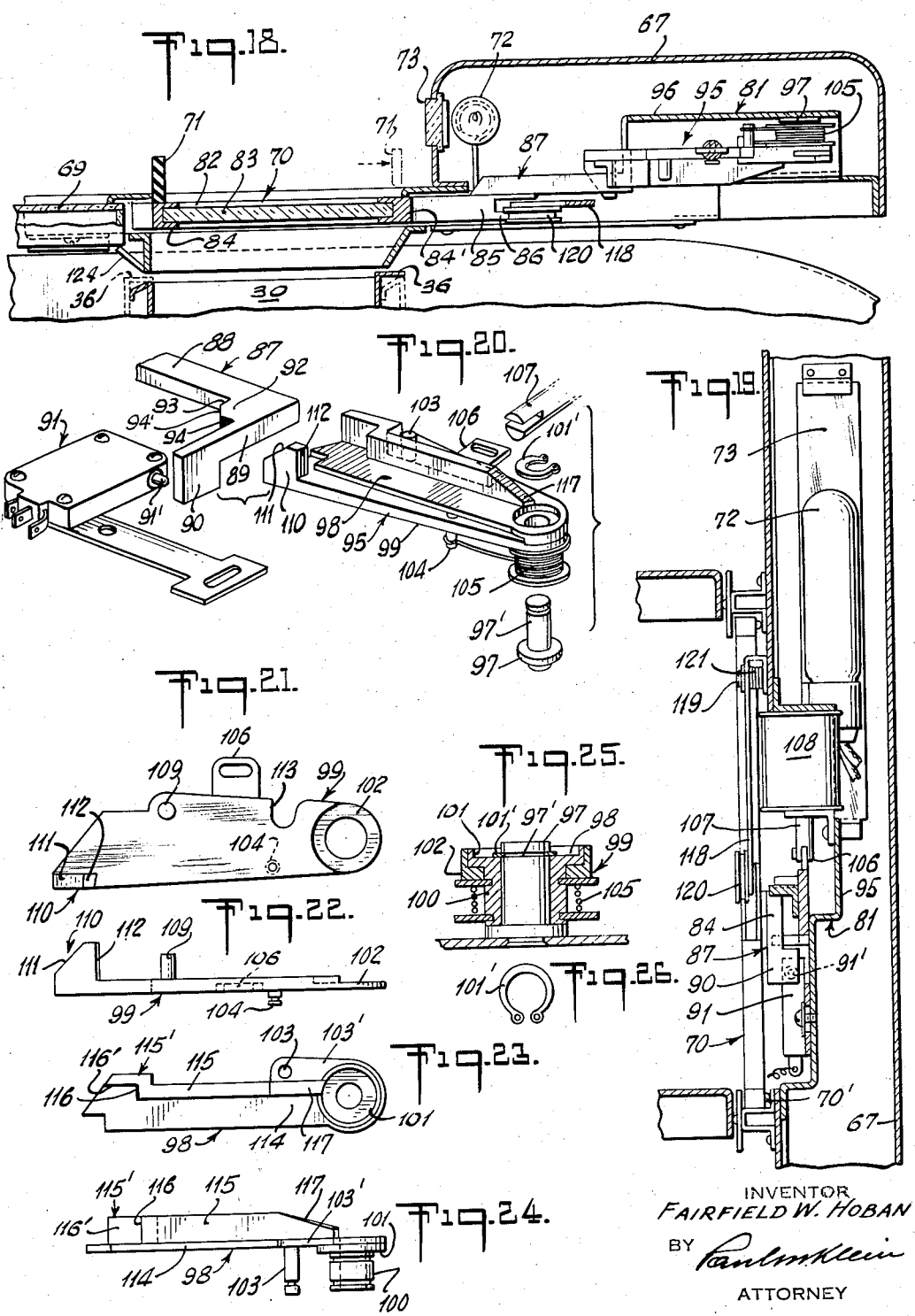
INVENTOR
FAIRFIELD W. HOBAN
BY
ATTORNEY March 3, 1959 F. W. HOBAN 2,875,878
VENDING MACHINES
Filed July 26, 1952 8 Sheets-Sheet 7
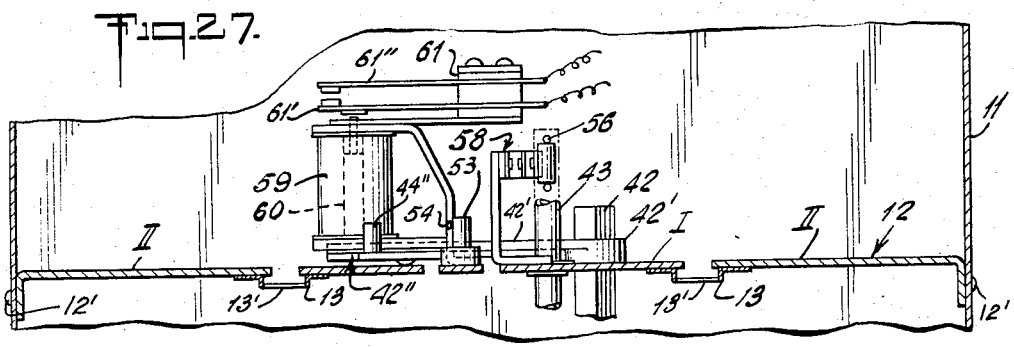
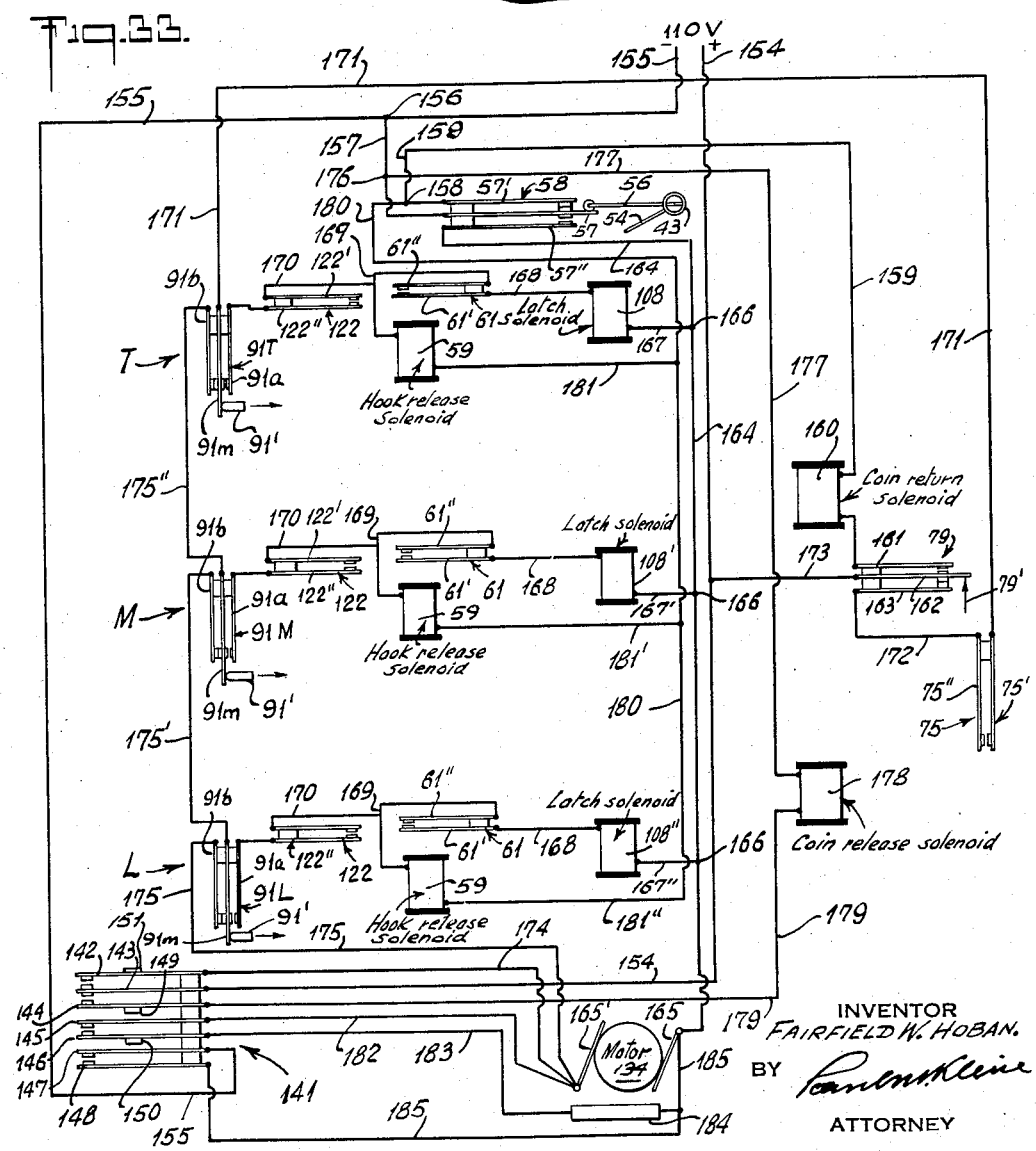
INVENTOR
FAIRFIELD W. HOBAN.
BY
ATTORNEY

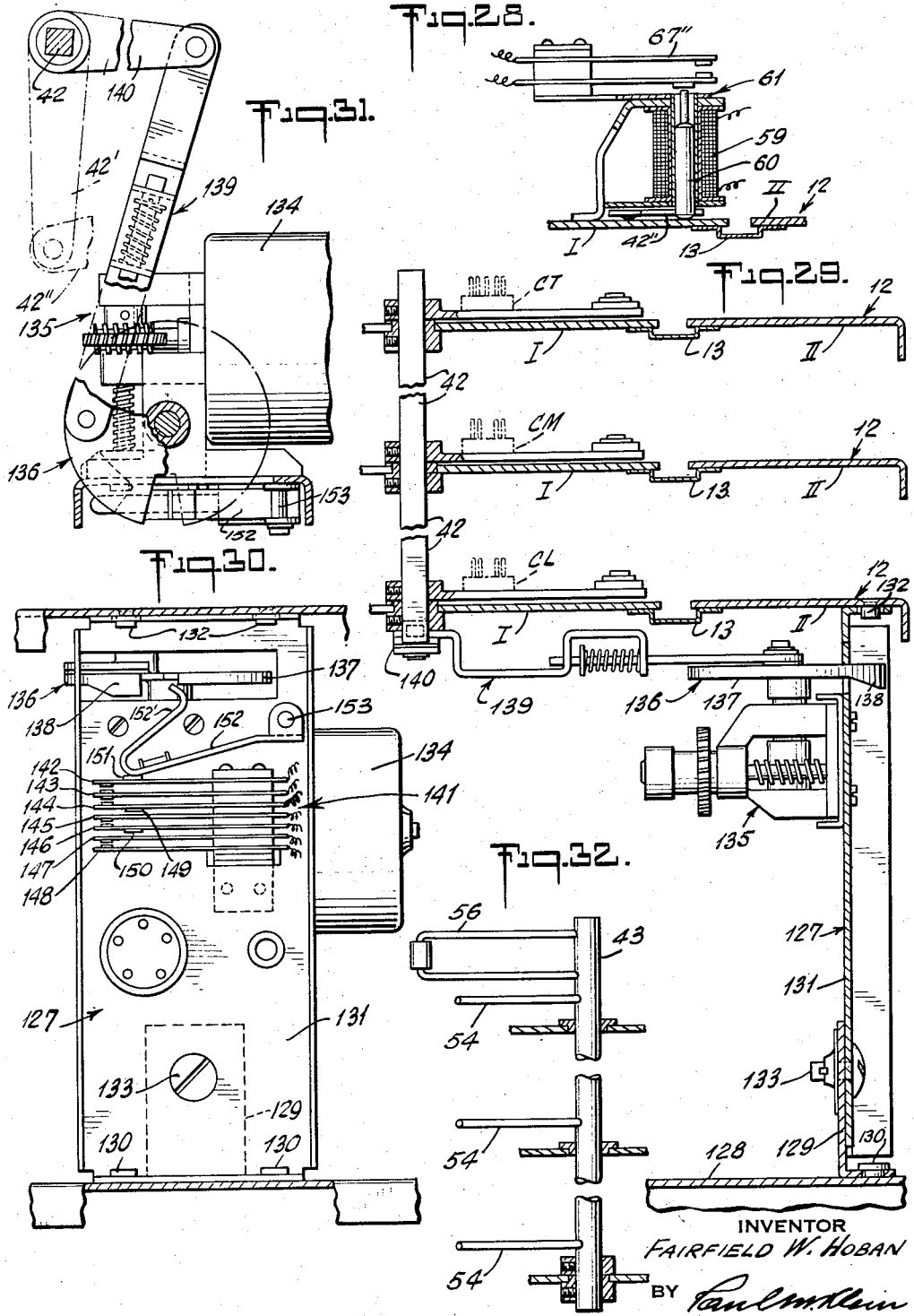

United States Patent Office 2,875,878
Patented Mar. 3, 1959

2,875,878

VENDING MACHINES

Fairfield W. Hoban, Babylon, N. Y.

Application July 26, 1952, Serial No. 301,109

27 Claims. (Cl. 194—10)

This invention relates generally to coin-controlled vending machines similar to the kind disclosed in my co-pending application Ser. No. 225,737 filed by me on May 11, 1951, for Vending Machines, and in which application are disclosed endless article conveyers operative upon superimposed shelves or tiers. There is also shown in that application an arrangement for the delivery of articles whereby an article desired and paid for is released from any one of the tiers and progresses through aligned article containers of the conveyers to a point beneath the lowermost tier from where the article can be removed.

In the present disclosure, the vending machine is also provided with superimposed tiers, each tier being equipped with a platform supporting an endless article conveyer, and wherein each of the tiers and conveyers are rendered individually accessible by the provision of normally closed sliding doors which are so arranged that when one of the doors is opened, it facilitates the removal of an article carried by its respective conveyer.

The doors of all tiers or conveyers are normally held in closed position and are electrically interconnected with one another, and the opening of any one of the doors is controlled by the deposit of a coin of the correct value in payment for an article carried by the conveyers, the machine being provided with but a single coin-receiving slot.

When a coin is inserted into that slot, all of the doors are rendered openable, but the opening of one of the doors automatically renders all other doors non-openable, and the closing of that one open door starts the operation of its corresponding conveyer, the conveyer then executing a movement for a distance corresponding substantially to the width of an article carried by the conveyer, it being assumed that all conveyers carry the same type of articles and that the articles are all uniform in dimension.

Having thus roughly outlined the structure and operation of the present coin-controlled merchandise vending machine, the principal objects of the instant invention involve the provision of a vending machine of the type indicated comprising a substantially fully closed vending machine cabinet wherein are arranged upon superimposed tiers, platforms for the support of endless conveyers operative upon these platforms and, wherein for each of the tiers and conveyers are arranged individual doors to provide, when opened, access to the respective conveyers for the removal of articles carried by them, and wherein all of the doors are provided with electrically interconnected control means so arranged that when one of the doors is opened, all other doors are prevented from opening, and wherein the operation of all of the doors is controlled by a single coin receiver for the entire machine so that when a coin of the correct value is inserted into the receiver, all of the doors of the machine are rendered openable.

A further important object of the present invention is the provision in the afore-defined vending machine of certain electro-mechanical means so arranged that when any of the opened doors is closed, after the removal of the desired article from its respective conveyer, that conveyer is caused to operate to bring into registry with the door the next article so that it can be removed from the conveyer through the door, when the latter is again opened.

A still further object of the present invention is the provision of a coin-controlled vending machine wherein are arranged superimposed tiers supporting removable and interchangeable platforms on all tiers below the topmost tier, although that tier is also removable, but is not interchangeable with the lower tiers, and wherein each of the platforms support an endless conveyer, and wherein each of the conveyers is operable independently of all other conveyers at one time, and wherein normally closed doors are provided for each of the conveyers to permit access to the latter when the door is opened, and wherein a common or central actuating mechanism for all of the conveyers is provided beneath the lowermost tier of the machine, and wherein single coin-responsive control and releasing means for simultaneously freeing all of the doors to render them individually openable is provided in the machine, and wherein that coin-responsive control forms a part of an electric system for governing the operations of the doors and of the actuating mechanism for the conveyers, and wherein that actuating mechanism is motor-driven and includes an operating shaft powered by said motor, and which operating shaft serves for actuating any one of the conveyers individually, when the first opened door for one of the conveyers is brought to its closed position, the closing of the door energizing a circuit and causing the operation of the respective conveyer.

A further object of this invention is the provision for each tier in the vending machine of an individual article conveyer comprising a link chain composed of substantially platform-shaped main links and connecting links for the latter, and wherein the main links are provided with engageable recesses at their interior edges, that is along the interior periphery of the link chain, and wherein each main link carries an individual article holder or container and wherein each holder is provided with a movable article-supporting bottom, the latter being equipped with means for actuating a weight-responsive switch arranged in the conveyer-supporting platform so that the weight of an article carried in the container will hold the movable container bottom always in position to actuate the switch, and wherein for each of the conveyers there is provided an individual conveyer-operating lever or arm extending from a common operating shaft driven by a motor, and wherein with each of the operating arms is connected a delivery hook adapted to be moved by said operating arm in reciprocal, substantially linear directions relative the link chain, and wherein means are provided for normally urging the delivery hook towards the link chain to engage, when released, the engageable recess of one of the chain links, and wherein said delivery hook cooperates with a chain detent, the latter being adapted to normally prevent the movement of the link chain; said delivery hook, during its initial movement, dislodging the chain detent from its normal engagement with the link chain; there being provided electrically controlled means for normally retaining the delivery hook in chain-disengaging position and, when energized, for releasing the delivery hook to its chain-engaging position; said delivery hook, when released to that latter position, becoming actuated by its operating arm, thus causing the movement of the link chain for a distance equalling that between the centers of two adjacent main links.

A further object of this invention is the provision of a coin-controlled electric system for the vending machine, and which system includes, as one unit for the entire machine, a coin-detector, a coin rejector for rejecting defective coins, and which system comprises, also as one unit for the entire machine, a starter or main control switch disposed at the topmost tier of the vending machine, a coin-actuated switch which, when closed by a coin, initially energizes the system; a coin-return solenoid with a switch for the latter; a motor for operating the vending machine mechanism; a multiple-blade switch controlled by the operation of the motor; also a coin-retention solenoid controlled by a pair of switch blades of said multiple-blade switch; said system further comprising, as individual units for each tier, each conveyer and each door, a door latch controlled by a solenoid having a movable armature; another armature-equipped solenoid controlling the position of the delivery hook relative its respective link chain; and an arrangement of three series-connected switches for energizing, when closed, the solenoids for the delivery hook and for the door latch; and wherein said three series-connected switches comprise a double-throw triple-contact switch operable by the door, a weight-responsive switch operable by the weight of an article carried by the conveyor, and a third switch operable by the armature of the delivery hook solenoid.

A still further object of this invention is the provision, in the vending machine of the type indicated, of a main door constituting a major front portion of the machine and in which main door are removably mounted observation windows, illuminated ports and doors, one door for each tier or conveyor, and which main door is provided with a single catch or latch extending along the height of the door and being preferably lockable by means of a key.

Still another important object of the present invention is the provision of a vending machine of the type indicated which is equipped for refrigeration throughout its interior to prevent deterioration of the articles within the machine, thus keeping them always in condition for consumption.

A further object of the present invention is the provision for the doors of a vending machine of the type indicated, of resilient handles facilitating either a limited shifting movement of the doors, while in substantially closed position, or the opening of the doors to their fully opened position, and which resilient handles are designed to prevent forceful straining of the doors.

The foregoing and a great number of additional objects and other important advantages of the present invention will become more readily understood from the following description in connection with the accompanying drawings, which latter although disclosing specific embodiments of the machine and its component parts, are by no means intended to limit the present disclosure to the structural details shown, and wherein:

Fig. 1 is a front elevation of the coin controlled merchandise vending machine with portions thereof omitted;

Fig. 2 is a plan view of a typical arrangement of a conveyer-supporting platform, but applicable especially to the conveyer and platform of the topmost tier of the machine;

Fig. 3 is a detail illustration of the starter or main switch located at the topmost conveyer platform, and the switch-engaging arm extending from the switch-operating bar;

Fig. 4 is an enlarged detail illustration of a portion of the door latch for the main door of the vending machine;

Fig. 5 is an enlarged fragmental plan view of a link chain portion of the article conveyer with one of the links supporting an article container;

Fig. 6 is a section taken approximately along lines 6—6 of Fig. 5, with a portion of the article container in elevation;

Fig. 7 is a perspective view of a main link of the conveyer chain;

Fig. 8 is a perspective view of the mobile bottom of the container;

Fig. 9 is a fragmental detailed section taken approximately along the lines 9—9 of Fig. 5;

Fig. 10 is a typical section through a portion of the conveyer-supporting platform, of the conveyer, of an article container and of the door for the conveyer, as well as of the weight-responsive switch in the platform;

Fig. 11 is a section taken approximately along lines 11—11 of Fig. 10, with the weight-responsive switch in side elevation;

Fig. 12 is a typical section through a fixed observation window of the machine taken approximately along lines 12—12 of Fig. 14;

Fig. 13 is a perspective view of a spacing frame registering with the door opening;

Fig. 14 is a detail view showing the door and its control mechanism as seen from inside the vending machine cabinet and looking outwardly;

Fig. 15 is a fragmental detail view showing the detent and the latch mechanism therefor, the latter being in its inoperative, detent-engaging position;

Fig. 16 is a similar detail view to that shown in Fig. 15 with the door latch mechanism in its elevated, detent-freeing or operative position;

Fig. 17 is a section taken along lines 17—17 of Fig. 14, showing a bracket for an illuminating bulb;

Fig. 18 is a horizontal section taken approximately along lines 18—18 of Fig. 14, and showing the spacing frame seen in Fig. 13 and also a part of an article container;

Fig. 19 is a section taken approximately along lines 19—19 of Fig. 14;

Fig. 20 is an exploded perspective illustration of the door detent, the double-throw triple-contact switch operated thereby, and the assembly of the door latch cooperating with the detent;

Fig. 21 is an elevation of the rear member of the door latch;

Fig. 22 is a bottom view thereof;

Fig. 23 is an elevation of the front member of the door latch;

Fig. 24 is a bottom view thereof;

Fig. 25 is a section taken approximately along lines 25—25 of Fig. 15;

Fig. 26 is an elevation of the locking member employed in the structure shown in Fig. 25;

Fig. 27 shows a portion of the mechanism of Fig. 2 seen from the right in the direction of the arrow 27, and a section through the platform;

Fig. 28 is a section taken approximately along lines 28—28 of Fig. 2;

Fig. 29 is a typical vertical fragmental section through several tiers of the machine with a part of the motor-driven mechanism and linkage for the operating shaft disposed beneath the lowermost tier;

Fig. 30 is an elevation of the motor support, the switch-operating lever, the motor cam for actuating it, and the multiple blade switch controlled by the lever;

Fig. 31 is a top view of the motor, its cam and the linkage connecting it with the operating shaft;

Fig. 32 is a fragmental illustration of the starter switch-operating bar; and

Fig. 33 is a typical wiring diagram showing the electric connections for the co-acting instrumentalities of the vending machine.

Considering Figs. 1 and 2, there is shown a vending machine 10 fully enclosed in a cabinet 11, the interior of which is divided by several superimposed tiers, all tiers having interchangeable conveyer-supporting platforms 12, except the topmost platform, all platforms being held in place by removable attaching elements, such as screws 12'; all of the platforms being composed of inner and outer portions "I" and "II" as shown in Fig. 2 (see also Figs. 6, 10, 11, 27, and 29) and which platform portions are connected by endless channel-shaped guides 13 depending from the platforms and being adapted to guide the conveyers when in operation. All inner portions "I" of the platforms have aligned openings 14 (see Fig. 2) for accommodating a cooling unit 15 which is intended to extend through the height of the machine.

Article conveyer

Each of the conveyers comprises an endless link chain composed of relatively broad main links 16 joined with one another by relatively narrow connecting links 17 by way of conveyer guide pins 18 (see Figs. 5 and 6). Each of these pins has a broad head 19, an annular guide enlargement 19' adjacent the head and a body passing from the bottom of the chain first through connecting link 17 and then through main link 16. Above the main link the pin body has an annular recess for receiving a spring washer 20 which securely holds the pin and the two link elements against disengagement from each other.

Guide enlargement 19' of the pin operates between the adjacent edges of platform portions "I" and "II," as clearly illustrated in Fig. 6, while head 19 extends into channel 13 and engages the lower faces of these edges. Channel 13 is provided with spaced perforations 13' which are larger in diameter than the heads 19 to facilitate the insertion of the pins from beneath the links in the manner stated above.

The illustration of main link 16 shown in Fig. 7 clearly indicates that that link is a platform-shaped stamping having an elongated perforation 21 near its exterior edge 22, while a swallow-tail recess 23 is provided at its interior edge 23'. That recess is designed for engagement by a chain detent and by an article delivery hook, as will be hereinafter disclosed.

From the body of main link 16 there extends adjacent to recess 23 an upwardly directed, centrally located, loop 24, and at one side edge of the link there will be seen another recess 25 accommodating an upwardly biased blade spring 26 attached to the bottom of link 16 by spot welding or otherwise, as indicated at 27.

From both side edges of the link there extend lugs arranged symmetrically in pairs and comprising a frontal lug pair 28 and another rearward pair 29, both lug pairs being intended to facilitate the correct location with the link of an article container or receptacle.

Article container

As shown in Figs. 2, 5, 6, 8, 9, 10 and 11, article container 30 comprises a three-wall structure having side walls 31, 32, rear wall 33, a fixed bottom 34 and a mobile bottom 35, the latter being illustrated in Fig. 8.

Fixed container bottom 34 is a stamping having a flat body corresponding in shape to that of main link 16 and is designed for removable, face-to-face association with the latter. Bottom 34 has recesses registering with recesses 21 and 25 of the link (see Fig. 5), and possesses a channel-shaped front edge 22' adapted to engage outer link edge 22 (see Figs. 5, 9 and 10). Extending centrally from the rear edge of the bottom is lug 24' engaging loop 24 of the link. At both sides of lug 24' are two upwardly bent lips 34' to which is secured rear wall 33 of the container either by rivets or spot welds. Another pair of lips 34" extend from the side edges of bottom 34, pass through suitable slots in the container side walls and are secured to the latter by bending (see Figs. 5 and 6).

Spring 26 of link 16 normally engages recess 26' in container side wall 32 for locking the container to the link, but when the spring is depressed, container 30 can be removed.

In Fig. 5 it will be observed that container side walls 31 and 32 are provided with differently shaped vertical frontal edges 36 and 36'. Frontal edge 36 is disposed at right angles to side wall 31, while frontal edge 36' of side wall 32 slants rearwardly and is offset relative to edge 36 of the adjacent container, that arrangement of the frontal edges having the purpose of effecting an interlocking engagement between linearly aligned adjacent containers.

Mobile container bottom 35 has a downwardly directed frontal flange 37 adapted for cooperation with channel-shaped front edge 22' of fixed bottom 34 (see Figs. 5, 8, and 10). At its rear edge there are provided hinge lugs 38 spaced from the flat body of bottom 35 by recesses 39. Pressed out from the body of the mobile bottom is a downwardly directed ridge 40 adapted to cooperate and register with recess 21 of main link 16 and with a corresponding recess in fixed container bottom 34. Near that bottom there are provided in container rear wall 33 two opposite recesses 41 (see Fig. 5) for operatively accommodating hinge lugs 38 of mobile bottom 35 so that the latter can swing along its rear edge to the position shown in broken lines in Fig. 10. Mobile bottom 35 serves as support for an article "A" (see Fig. 10) placed in container 30, and normally rests upon the top surface of fixed container bottom 34, with the ridge 40 of mobile bottom 35 projecting into recess 21 of link 16, the height of ridge 40 being less than the combined thickness of fixed container bottom 34 and link 16. Bottom 35 is shown in its normal position in full lines in Fig. 10, and will assume its swung-up position, indicated in broken lines, only when the container reaches a position at which article "A" can be removed, as will be presently explained.

Conveyer operating mechanism

Through all tiers of the cabinet there extends an operating shaft 42 (see Figs. 2, 29 and 31) and also a switch-operating bar 43 (see Figs. 2 and 32), both of which elements pass vertically through the central sections "I" of the conveyer platforms.

Extending from shaft 42, which is preferably of square cross section, is an operating arm or lever 42' adapted to oscillate within certain limits. With the free end of arm 42' there is connected one end of a chain-engaging and conveyer-actuating element 42", referred to hereinafter as merchandise delivery hook or hook, and which latter is designed for reciprocal movement in opposite directions imparted thereto by arm 42' when shaft 42 is oscillated. The delivery hook has an arcuate recess 44 and a hook end 44' which is designed to engage the swallow-tail recesses at the interior face of links 16 when the hook is released into operative position, as will be explained presently.

Adjacent the hook end 44' there projects from the hook body a pin 44" constituting an abutment element intended for engaging and dislodging a conveyer detent 45. That detent is pivoted at 46 and is normally urged toward the conveyer links by spring 47, and has a projection 48 which is adapted to normally interlock with one of the recesses 23 of the link chain, as shown in full lines in Fig. 2. Detent 45 has a slanting front edge 49. Each of the platforms in the machine is equipped with the above described conveyer-actuating mechanism.

When hook 42" is released to its operative position, it first moves toward detent 45. Abutment pin 44" of the hook then engages slanting face 49 of the detent and lifts it to the broken-line position shown in Fig. 2, thus causing projection 48 to move out of engagement from recess 23. Detent 45 may be also manually dislodged and brought to a chain-disengaging position by means of lever arrangement indicated at 50, whereby the conveyer can be moved manually to facilitate "stocking" the machine with fresh merchandise. Obviously, lever 50 is operable only when the vending machine is opened.

Hook 42" is normally engaged and held under tension by a spring-loaded lever 51, spring 52 for the latter urging it against the top edge of the hook. At the end of lever 51 is a pin 53 which normally engages and bears against operating arm 54 extending from starter switch-actuating bar 43, a coil spring 55 for the bar having the tendency of turning the latter clockwise, thereby urging arm 54 toward pin 53. Extending also from bar 43 is a switch-operating arm 56 adapted, when the bar is turned by arm 54 and pin 53 against the tension of spring 55, to engage the middle blade 57 of the three-blade starter or main switch 58. Middle blade 57 normally contacts upper blade 57', but when moved by arm 56 it disengages the upper blade and effects contact with lower blade 57" (see Fig. 3).

Mounted above hook 42" is a solenoid 59 provided with a movable armature 60 (see Figs. 27 and 28) which armature normally rests against platform section "I" and thus holds hook 42" in its chain-disengaging position, shown in Figs. 2 and 28. Above solenoid 59 there is mounted a normally open two-bladed switch 61, the function and purpose of which will be explained presently.

When the solenoid becomes energized, armature 60 is elevated and releases hook 42". The release of the hook also releases spring-loaded lever 51 which now presses the hook into engagement with the conveyer chain. That movement of lever 51 also causes the operation of arms 54 and 56 of bar 43 and the disengagement of switch blade 57' by middle blade 57 of starter switch 58, and the closing of contact blades 57 and 57".

The operation of the conveyer will be explained in conjunction with the operation of the entire vending machine mechanism.

Cabinet construction

Again referring to Figs. 1 and 2, cabinet 11, which is preferably insulated, has a main door 62 extending along substantially the entire height of the machine. The door is hinged along one of its edges at 63 and has a locking arrangement 64 along its other edge. A portion of that locking arrangement is illustrated in Fig. 4 and comprises a movable bar 65 having suitable slots adapted, when the bar is in its downward position, to interlock with upwardly pointed, hook-shaped detents 65' extending from the door edge, thereby locking the door along its entire edge. Bar 65 is preferably operable by means of a handle or pedal 66 shown in broken lines in Fig. 1 and extending from the lower end of the bar. By elevating the bar the door is unlocked and by pulling it down when the door is closed, it locks the door, hereinafter referred to as main door. From handle or pedal 66 there preferably extends a lockable projection, not shown, by means of which bar 65 can be operated.

Main door

As will be observed from Figs. 1 and 2, main door 62 has two oppositely disposed left and right hollow channel-shaped formations 67 and 68, and between these channels are located observation windows 69 and sliding doors 70, operating in suitable door guides 70', the doors being provided with resilient operating handles 71. For each tier and conveyer, there is one observation window 69 and one door 70 adjacent thereto. When observing the cabinet from the front, these doors are designed to be moved to their opening position in left-hand direction, that is, to a position in the rear of channel 67. (See also Figs. 18 and 19.)

That channel accommodates the entire control mechanisms for all of the doors as well as the left-hand illuminating lamps 72 disposed in back of transparent or translucent narrow windows 73 arranged in the flange of channel 67 nearest to the doors (see Figs. 14, 17, 18 and 19). Similar illuminating lamps 72' are provided within channel 68 in rear of translucent windows 73' adjacent to observation windows 69. (Fig. 2.)

Coin-handling mechanism

As indicated, the present vending machine is coin controlled, and for the purpose of simplifying the description and understanding of the device, it is assumed that all of the article conveyers operating on each tier of the machine handle articles of the same type, the same dimensions, the same weight and are available for the same price, the above assumption being resorted to for no other than the above-stated reason and to facilitate the explanation of principles involved.

Taking the above-assumed conditions as working basis for the present device, it is assumed also that the machine is provided with but a single coin slot or coin receiver 74 conveniently located in channel 68 of main door 62. A coin inserted into that coin slot passes several devices including a coin-operated switch 75, the function of which devices will be presently explained.

The coin first drops into a coin detector 76, a device well known in the art, adapted to segregate good coins from defective coins or slugs and to reject slugs or defective coins and to return them to the would-be purchaser.

Having passed the test of the coin detector, the coin 77 is retained in a releasable position in a coin retainer, indicated at 77' in Fig. 1, and from that position it can be either returned to the would-be purchaser, if the latter so desires, or the coin is caused to drop into coin box 78 in payment of a purchased article. The return of the coin to the would-be purchaser is effected by the manual operation of a switch 79, by pressing either a lever or button as indicated at 79'. Details of the coin-manipulating instrumentalities are not shown because they are well known and do not require specific explanation. Suffice it to say that when either a slug or defective coin is rejected by the coin detector, or when the would-be purchaser desired the return of the coin, such slugs or coins are delivered through suitable chutes to a coin receptacle 80, shown at the lower end of Fig. 1, from which the returned coins can be removed.

Door control mechanism

Referring now again to Figs. 1, 2, and also to Figs. 14 to 24, it will be noted that in the left-hand hollow channel formations 67 of the main door there are arranged certain instrumentalities, generally indicated at 81, designed for controlling the operation of doors 70.

Each of the doors comprises a frame 82 (Figs. 14, 18) in which is removably mounted a transparent panel 83 to permit observation of the article in a container carried by the conveyer and aligned with the panel of the door. Resilient door handle 71 extends from one vertical frame member 84 of the door, while with the opposite vertical frame member 84', there is associated a door detent support 85 plainly seen in Fig. 14. That detent support has at least one bevelled edge 86, and extending from that support is a door detent 87. That detent (see Figs. 14, 15, 16, 18, 19 and 20) comprises an angle structure composed of a horizontal leg or member 88 from which depends at right angles a vertical leg or member 89, which latter has an enlarged end portion 90 serving as an actuating abutment for a switch 91, as will be presently explained. At the corner formed between horizontal and vertical legs 88 and 89, there is provided a corner enlargement or filler 92 which has a vertical abutment face 93, a horizontal face 94 and inclined connecting face 94'.

Door latch

Cooperating with door detent 87 is a door latch mechanism 95 operative in a bracket 96 and controlled by an armature-equipped solenoid. Secured to bracket 96 and extending therefrom is a pin 97, pivotally supporting door latch 95, the latter being composed of interconnected frontal and rear members 98 and 99, both coaxially disposed relative pin 97 (see Fig. 20). The interconnected portions of latch members 98 and 99 are illustrated in Fig. 25, wherein it is shown that frontal member 98 is equipped with a flanged hub 100 which is directly supported by pin 97. Behind flange 101 of the hub is held collar 102 forming the pivotal end of the rear member 99. Pin 97 has an annular recess 97' engaged by spring clip 101' (see Fig. 26) bearing against flange 101, thus fixedly securing the latch upon the pin.

From each of the latch members 98 and 99 there extend pins 103 and 104, respectively, which serve for accommodating the ends of coil spring 105, which is adapted to normally urge the frontal latch member 98 upwardly with respect to rear latch member 99 (see Figs. 14, 17 and 20 to 26).

From the body of rear member 99 projects a perforated lug 106 adapted to facilitate operatively connecting that member with armature 107 of solenoid 108, which latter controls the operation of the door latch (see Figs. 14 to 20). Extending from the front face of the rear member is an abutment pin 109 which is designed to limit the movement of the frontal latch member 98 relative to rear latch member 99. The left-hand edge of the rear member is bevelled, and at the juncture between its bevelled edge and its bottom edge there will be seen a lug 110, extending at right angles from the body of member 99, and having a bevelled front surface 111 and a substantially vertical but slanting rear face 112, the latter serving as an abutment adapted to cooperate with vertical face 93 and inclined face 94' of corner enlargement 92 of the door detent. It will be noted in Fig. 21 that at the upper edge of rear member 99 there is a recess 113 serving to accommodate and to permit the operation therein of spring-supporting pin 103 of the latch front member 98.

The front member has a flat normally vertical body portion 114 from which extends a horizontal ledge 115 (see Figs. 23 and 24) having a step-like end 115' provided with a vertical abutment surface 116, which latter is adapted to cooperate with the outer face of the depending leg 89 of detent 87. The rear or right-hand end of ledge 115 is bevelled at 117. Pin 103, with which one end of coil spring 105 is associated, projects from an extension 103' of flat body portion 114 of member 98, and is located just above that bevelled end 117 of ledge 115. In their assembled form, seen in Fig. 20, latch members 98 and 99 are so joined that the front face of rear member 99 is in close adjacency to and cooperates with the rear face of front member 98.

The cooperation between door detent 87 and door latch 95 will be more readily understood in observing Figs. 14, 15 and 16. Of particular importance is the co-action of abutting face 93 of corner enlargement 92 of detent 87 with abutting face 112 of lug 110 and the co-action between the right-hand face of depending detent element 89 and abutting surface 116 provided in the step formation of ridge 115.

In its normal, inoperative state, latch structure 95 assumes the position shown in Fig. 14, being held in that position by gravity action. Adding to the weight of the latch is armature 107 of solenoid 108, with which armature rear member 99 of the latch is operatively associated.

In that position, the two latch members are held together by means of coil spring 105 so that undersurface 116' of the step formation in ridge 115 rests upon the top surface of horizontal detent portion 88. The right-hand face of depending detent element 89 is shown somewhat distanced from ledge abutment face 116. At the same time, corner enlargement 92 of the detent just clears lug 110 of latch rear member 99, and switch-operating enlargement 90 of depending detent element 89 exerts pressure against actuating button 91' of switch 91.

That position of the detent is the normal position thereof when door 70 is closed. Holding the door in that position is a lever 118, pivoted at 119, and equipped with a roller 120, which latter engages bevelled surface 86 of detent support 85. A spring 121 urges that lever and its roller 120 into tensional engagement with that bevelled surface and thereby retains the door in its closed position, and detent 87 in its normal switch-depressing position shown in Fig. 14.

While latch structure 95 remains in its normal, gravity-held downward position shown in that figure, door 70 may be shifted by means of flexible handle 71 within the limits defined in one direction by ridge abutment 116 of frontal latch member 98 and the right-hand face of depending detent element 89, and in the other direction by abutment face 93 of detent corner enlargement 92 and by lug face 112 of rear latch member 99. When the door is thus moved in reciprocal directions within those limits, enlargement 90 of detent element 89 will cause alternate compression and release of switch button 91', as shown, respectively, in full lines in Fig. 14, and in broken lines in that figure, and in Fig. 15, in full lines.

When solenoid 108 becomes energized, armature 107 lifts detent structure 95 to its position shown in Fig. 16. In that position of door latch 95, detent 87 is freed to move in the right-hand door-opening direction of broken-line arrow "R," to its right-hand end position shown in broken lines in that figure.

*Weight-responsive switch*

As stated in connection with Fig. 2, conveyer-supporting platform 12 is composed of inner and outer portions "I" and "II." In the latter portion there is shown in greater detail in Figs. 10 and 11, a weight-responsive switch indicated at 122. For simplicity reasons that switch is illustrated as consisting of two normally spaced blades 122' and 122," although for these blades may be substituted any other suitable switch structure, preferably a microswitch. The purpose of the switch is to close an electric circuit when subjected to the force of weight, such as the weight of an article placed in a container 30 carried by each of the conveyer links.

In the description of article container 30, it was stated that mobile container bottom 35 normally rests against fixed bottom 34, shown in that position in full lines in Fig. 10, as ridge 40 of mobile bottom 35 is nested in recess 21 of link 16.

Forming a part of switch structure 122 is a resilient member 123, one part of which forms an upwardly bent portion 123' adapted to normally project through a suitable slot 123" provided in platform portion "II" just opposite the door 70. The projecting portion of member 123 is designed to not only extend above the platform, but to also enter slot 21 of link 16 when a container is brought by the conveyer over slot 123".

Since ridge 40 of mobile bottom 35 is normally held by the weight of article "A" within slot 21, resilient member 123 will be depressed. The free end of member 123 is insulated and normally rests lightly against the end of upper switch blade 122'. When now member 123 is subjected to weight and becomes depressed, it causes blade 122' to engage lower switch blade 122", thereby closing an electric circuit.

*Door safety frame*

In order to prevent the possibility of accidents during the removal of articles from containers 30 of the conveyer, and also for the purpose of preventing misuse of the machine, there will be seen in Figs. 10, 13 and 18 a spacer frame 124. As shown in Fig. 18, that spacer frame is interposed between the door opening and the outer flanges 36 of two adjacent containers 30. Thus there is left but very little open space between the door opening and the containers. Obviously, each door opening is provided with its own spacer frame, and the spacer frames of the superimposed tiers interlock with one another by means of their lips 125 at the top of the frames and lugs 126 at the bottom thereof. (See Fig. 13.)

*Vending machine operating mechanism*

Fig. 29 is a typical cross section through portions of several tiers arranged within the vending machine cabinet, and beneath the lowermost tier there is illustrated a motor support 127 extending from machine bottom 128. This motor support is adjustable and comprises a bracket 129 fixedly secured at 130 to bottom 128, and adjustably connected with that bracket is a flanged plate or channel 131 attached with its upper end to the lowermost conveyor platform by rivets or screws 132, the adjustment between plate 131 and bracket 129 being effected by bolt 133.

Removably supported by plate 131 is a motor 134 and a worm gear transmission 135 driven by the motor. At the top of the transmission and driven by the latter is a two-stage or double cam 136 having a narrow cam surface 137 and a wider cam surface 138. That double cam also serves as a crank for actuating a spring-controlled linkage 139 which operatively engages a lever or arm 140 secured to the bottom end of conveyor-operating shaft 42.

The movement of linkage 139 by cam structure 136 causes arm 140 to swing within a certain arc and that swinging movement is translated through shaft 42 to all of the lever arms 42' actuating hooks 42".

Multiple switch

Secured to motor support plate 131 is a multiple switch 141 composed of 7 blades, 142, 143, 144, 145, 146, 147 and 148, all of which blades are normally spaced from one another. Blade 143 is a double contact blade, and between blades 144 and 145, and blades 146 and 147, there are provided insulating spacers 149 and 150, respectively. Also on top of blade 142 is an insulating block 151. The latter is adapted to be engaged by a pivoted lever 152 which is hingedly supported at 153 from motor support 127. Lever 152 has a curved upper end 152' which is adapted to be engaged first by cam 137 and then by cam 138 as double cam structure 136 revolves. When cam 137 first engages lever 152, blades 142, 143 and 144 are brought into contact with one another. When the depression of lever 152 is continued by cam 138, all seven blades are depressed so that contact is also made between blades 145 and 146, and between blades 147 and 148.

Wiring diagram

In Fig. 33 there are shown main leads 154 and 155 supplied by line current, lead 155 extending to blade 147 of multiple blade switch 141. Branching off from lead 155 at 156 is a lead 157 which extends to middle blade 57 of starter or main triple-blade switch 58, blades 57 and 57' of which normally contact one another. However, when switch-operating bar 43 is moved in anti-clockwise direction, its switch-operating lever 56 engages middle blade 57 and causes it to disengage blade 57' and to engage the normally free blade 57".

Switch blade 57' is connected at 158 with lead 159 which extends through coin-return solenoid 160 to the upper, normally free blade 161 of coin-return switch 79. The latter is a three-blade switch, the middle blade 162 of which is operative and normally engages lower blade 163, but can be manually operated as at 79' to disengage blade 163 and to engage normally free blade 161, thereby energizing coin-return solenoid 160.

Referring again to starter switch 58, its normally free blade 57" is connected by lead 164 with terminal 165 of motor 134. Extending from lead 164 at 166 are branches 167, 167' and 167" which pass to door latch solenoids 108, 108' and 108". From these solenoids leads 168 extend to the lower blades 61' of latch solenoid controlling switches 61 disposed above hook solenoids 59. The other blades 61" of these switches are connected by leads 169 with one terminal of hook solenoids 59 and from leads 169 branch leads 170 extend to blades 122' of the normally open two-blade weight-responsive switches 122, which become closed when weight depresses blades 122'. The other blades 122" are connected with normally free blades 91a of triple-blade door detent-operated door switches 91T, 91M and 91L. Middle blades 91m and blades 91b of these door switches are intended to be normally in engagement with one another as long as the doors remain closed, and switch buttons 91' are depressed by door detent 87. Door switches 91 are preferably double-throw three-contact type switches as indicated in Figs. 14, 15 and 20, but are illustrated in the form of three-blade switches in Fig. 33. Middle blade 91m of switch 91T is connected by lead 171 with blade 75' of coin-actuated switch 75, which latter can also be a microswitch as indicated in Fig. 1. Its other blade 75" is connected by lead 172 with the lower switch blade 163 of coin-return switch 79, also of a microswitch type as indicated in Fig. 1.

Middle blade 162 of switch 79 is connected by lead 173 with main conduit 154, which conduit extends to double-contact blade 143 of the multiple blade switch 141. Blade 142 of that switch is connected by a lead 174 with terminal 165' of motor 134. From that motor terminal or brush there extends another lead 175 to blade 91b of the lowermost door detent-actuated switch 91L shown in the diagram. Middle blade 91m of switch 91L is connected by lead 175' with blade 91b of the door switch 91M, and lead 175" connects middle blade 91m of switch 91M with blade 91b of door switch 91T.

As will be noted in the diagram of Fig. 33, only three door detent-operated switches are illustrated—that is switch 91T of the uppermost platform, switch 91L of the lowermost platform, and the switch 91M of any of the intermediate platforms.

Referring again to lead 157 which branches off at 156 from main lead 155, there is connected with lead 157 at 176 a lead 177 which extends to coin-release solenoid 178 which latter, when energized, permits the coin to drop into coin box 78 when the purchase of an article from the vending machine is completed. From solenoid 178 there extends a lead 179 to switch blade 144 of multiple blade switch 141. As stated, when switch blades 143 and 144 are brought into contact with one another, coin-release solenoid 178 becomes energized.

Referring again to starter or main switch 58, its blade 57' is connected at 158 by a lead 180 with all lower terminals of hook release solenoids 59 by way of auxiliary connections 181, 181' and 181".

Switch blades 145 and 146 of multiple blade switch 141 are connected, respectively, by lead 182 with motor terminal 165' and by lead 183 to one terminal of a motor field resistance 184, while the other terminal of that resistance is connected with lead 185, one portion of which extends to motor terminal 165 and its other portion to the lowermost blade 148 of the multiple blade switch.

In order to simplify identification of the several instrumentalities for each of the tiers indicated in Fig. 33, the arrangement of switches and solenoids of the topmost tier is indicated by arrow T, the same arrangement for the middle tier is denoted by arrow M, and the arrangement on the lowermost tier by arrow L, all of which letters will be referred to in the following.

It will be noted that door-operated switches 91, weight-responsive switches 122 and hook solenoid switches 61 are connected in series with each other and with leads 171 and 167.

Operation

Referring to Figs. 1 and 33, in Fig. 1 there is indicated at 74 a coin receiver, and substantially below the latter there is situated a coin-operated switch 75, also indicated in Fig. 33 at right. Fig. 1 further discloses a coin 77 being temporarily suspended near switch 75 in a coin retainer 77', and just below coin receiver 74 is located coin return switch 79 operable manually by a device 79', also indicated in the diagram of Fig. 33 in the shape of an arrow.

When switch 79 is operated by device 79', coin return solenoid 160 becomes energized and causes the return of a deposited coin.

Additionally, there is shown in Fig. 1, a coin box 78 into which coins are released in payment for articles purchased from the machine. The release of a coin into the coin box is effected when coin release solenoid 178 shown in Fig. 33 becomes energized by closing switch blades 143 and 144 of multiple blade switch 141.

Assuming now that all switches shown in the diagram are in their respective positions indicated, when a coin is inserted into receiver 74, and has passed the usual coin detector and been found by that detector acceptable, it will then close switch 75, seen at the right-hand side of the wiring diagram.

As coin 77 closes switch 75 it is caused to drop into coin retainer 77' where it is temporarily held. While in the retainer the coin keeps switch 75 closed until it is released when the coin release solenoid 178 becomes energized as switch blades 143 and 144 of multiple blade switch 141 are brought into contact with one another.

Starting with main lead 154, it will be seen that the latter's branch lead 173 is connected with blade 162 of coin release switch 79, and, since blades 162 and 163 normally contact each other, connection is established from blade 163 through lead 172 to switch blade 75" of coin-actuated switch 75, now closed by the inserted coin.

Thus connection is effected through lbade 75' of switch 75 to lead 171 and through that lead to middle blade 91m of door-operated switch 91 at the topmost tier "T." As long as door 70 of tier "T" remains closed, blades 91m and 91b are kept in their normal contacting position, thus connection is established from switch blade 91b through lead 175" to middle blade 91m of switch 91M on tier "M." Since again blade 91b is normally engaged by middle blade 91m of that switch, connection is effected through conduit 175' to switch middle blade 91m of the lowermost switch 91L, and since again blade 91m is normally in contact with blade 91b of switch 91L, connection is established through conduit 175 to motor terminal 165'.

Having thus effected connection from main conduit 154 to terminal 165' of the motor, it is now necessary to point out the connection between the other main terminal 155 and terminal 165 of the motor. Following lead 155 first to connecting point 156, lead 157 extending from that point is connected with middle blade 57 of starter or main switch 58; blade 57, normally engaging blade 57', establishes connection through that latter blade and leads 180, 181, 181' and 181" to the lower terminals of the hook release solenoids 59 of all tiers in the machine. The upper terminals of these solenoids are connected by leads 169 with switch blades 61" of normally open hook solenoid switches 61. From leads 169 extend leads 170 to the upper switch blades 122' of weight-responsive switches 122.

As long as articles are retained in conveyer containers positioned opposite doors 70, switches 122 will be closed. When now a door, for instance the door of platform "T," is moved toward its opening position in the direction indicated by the arrow, switch button 91' releases middle blade 91m to disengage blade 91b and to engage blade 91a. This movement of middle blade 91m of switch 91T de-energizes blade 91b of all of the door switches 91T, 91M to 91L of all tiers; however, the connection of switch blades 91m and 91a of tier "T" energizes hook solenoid 59 of that tier. When thus energized, the armature of that solenoid will release merchandise delivery hook 42" to its chain-engaging position and at the same time will close switch 61. The release of hook 42" also releases switch operating arm 56 of rod 43. Arm 56 forces middle contact blade 57 against lower blade 57", thus closing the negative lead to motor 134 and to door latch solenoid 108, while switches 61, 122, 91m and 91a are closed. Armature 107 (see Fig. 16) of the now energized solenoid moves the door latch to its operative position, that is, a position at which detent 87 is released, thus facilitating the full opening of the door and the removal of the paid-for article.

Removal of the article opens switch 122 whereby solenoid 108 becomes deenergized. The closing of the door again completes the positive lead to the motor which then starts.

The release of delivery hook 42" by the armature of the hook solenoid 59 causes spring-loaded arm 51 to force hook 42" into its chain-engaging position, but additionally causes the movement of bar-operating arm 54 toward the conveyer, whereby bar 43 is turned sufficiently so that its switch-engaging arm 56 engages middle blade 57 of starter switch 58, thereby breaking the connection between blades 57 and 57' and making connection between middle blade 57 and lower blade 57" (see Figs. 2, 3, and 33).

Since middle blade 57 is connected by lead 157 with main lead 155, and since blade 57", now engaged by blade 57, is connected by lead 164 to terminal 165 of the motor, the motor becomes energized and commences the movement of oscillating shaft 42, whereby hook 42" is caused to move first in forward or right-hand direction (see Fig. 2) towards chain detent 45. During that movement of hook 42", its abutment pin 44" will engage the slanting face 49 of detent 45 and bring the latter to its broken-line position, that is, to a position at which its extension 48 releases swallow-tail recess 23 formerly engaged by the latter, thus freeing the chain for movement by hook 42", when the latter engages the next adjacent chain recess 23 and is moved in reverse direction by oscillating shaft 42.

Each successive movement of the conveyer chain imparted thereto by hook 42" during each operating cycle of the latter represents a distance equal to the spacing between the center lines of two adjacent links.

A complete operating cycle of hook 42" effecting one of the successive conveyer movements includes the release of the hook from its starting position (shown in Fig. 2) by armature 60, the initial movement of the hook in right-hand direction towards detent 45 for the purpose of disengaging the latter from the chain, the hook's engagement of a link recess and its subsequent reverse movement, thereby imparting a clockwise movement to the conveyer, and lastly the hook's final return movement, again in right-hand direction, towards its starting position; the complete operating or working cycle of the conveyer and of the hook necessarily includes energizing of the motor which latter operates shaft 42 actuating the hook.

It will be understood that the movement of the conveyer by hook 42" is such that during each complete conveyer revolution or complete conveyer movement throughout the full length of its endless conveyer guide 13, each one of the containers or article holders 30 will come into registry with tier door 70 in the manner indicated in Figs. 10 and 18.

Door operation

As stated, door detent 87 has at the lower end of its depending vertical leg 89 an enlargement 90 which is adapted to normally depress switch button 91' of double-throw triple-contact switch 91. Detent leg 89 is held normally in that position through the agency of spring-loaded lever 118 which tensionally engages detent support 85 and thereby urges door 70 to its closing position (see Fig. 14). It will be observed from that figure that leg 89 can be moved in a door-opening direction to a very limited extent, that is, within the distance between the outer face of leg 89 and abutment face 116 of step-like formation 115' of frontal door latch member 98. The broken-line position of detent leg 89 indicated in Fig. 14 is its extreme right-hand position, while door latch 95 remains in its inoperative position shown in that figure.

The moment the door is moved towards its opening position so that detent leg 89 assumes that broken-line position, enlargement 90 releases switch button 91' and thereby causes blade 91m (see Fig. 33) to disengage blade 91b and to engage blade 91a, thus energizing door latch solenoid 108. The energized solenoid will tend to move armature 107 in upward direction, as indicated by the arrow in Fig. 15. The movement of armature 107 in upward direction is intended to elevate both spring-coupled members 98 and 99 of the door latch structure 95 to permit the full opening of the door. However, as the door is moved to the right (Fig. 15), detent leg 89 of the door forcibly engages abutment face 116 of latch member 98 thus preventing the latter member from moving upwards together with member 99, which member is free to move from its position shown in Fig. 14 to that indicated in Fig. 15.

While rear ledge member 99 is in that latter position, face 112 of lug 110 extending forwardly from that latch member serves as stop for face 93 of detent corner enlargement 92 when the door is moved in left-hand direction, as indicated by the full-line arrow in Fig. 17.

Slanting face 94' of detent corner enlargement 92 serves as guide for face 112 of lug 110 extending from rear latch member 99 as the latter member is caused by armature 107 to move in upward direction from its position shown in Fig. 14 to that seen in Fig. 15 when the door is moved in right-hand direction indicated by the arrow in the latter figure.

The moment the pressure upon the door is released slightly so that the outer face of depending detent leg 89 releases abutment face 116 of the frontal latch member 98, the latter is freed and is moved by spring 105 to its elevated position, thereby bringing both members of latch structure 95 to their operative, detent-releasing position shown in Fig. 16, so that the door can now be fully opened in the direction of broken arrow "R," detent leg 89 then assuming its broken-line right-hand position shown in that figure.

From the above-described cooperation between door detent 87 and door latch 95 it becomes evident that the door may be shifted in reciprocal directions within the limits defined by the distance between the outer face of detent leg 89 and latch abutment face 116, and that the door can be opened fully only when detent leg 89 releases abutment face 116, so that armature 107 can lift latch 95 to its detent-freeing position seen in Fig. 16.

Since the small shifting movement of the door invites temptation to play with the door in the hope of fully opening it without paying for the merchandise, flexible door handle 71 is designed to preclude any possible damage to the door and its control mechanism by meddling hands.

*Motor circuit and multiple blade switch operation*

It has been stated that starting or main switch 58 has its center blade 57 normally in contact with blade 57'. When a coin is inserted in the machine and is accepted, and one of the doors 70 is moved towards its opening position, hook solenoid 59 becomes energized, causing its armature to release hook 42" towards the conveyer chain. The release of the hook also releases spring-loaded lever 51 to press arm 54 of switch-operating bar 43 in the direction toward the conveyer, whereby switch-operating arm 56 moves blade 57 and causes it to disengage blade 57' and to engage blade 57".

While the door is in its open position, door switch blade 91m stays disengaged from blade 91b but engages blade 91a. Therefore, only lead 171, connected through coin switch 75 and coin return switch 79 to main lead 154 remains energized. In other words, the separation of middle blade 91m of switch 91T from blade 91b opens the circuit portion including lead 175", switch 91M, lead 175', switch 91L and lead 175 to motor terminal 165'.

When now the door is closed, after removal of the purchased article, door switch 91T is brought to its normal position as spring-loaded arm 118, tensionally bearing against detent support 85, brings the door to its closing position. (See Fig. 14.)

At that normal position of switch 91M, blades 91m and 91b contact, and connection is again effected from main supply lead 154 to motor terminal 165', and since blade 57 of main switch 58 is in contact with blade 57", current is supplied from main lead 155 to motor terminal 165, thus the motor becomes energized.

The motor actuates its transmission 135 and the latter rotates double cam 136 which in turn actuates linkage 139, shaft arm 140 and thus hook-operating shaft 42. Double cam 136 is designed to actuate switch-operating lever 152 by first engaging it by low cam portion 137. As that cam portion glides over the lever, the latter depresses the upper three blades 142, 143 and 144 and brings them into contact with one another. As a result, main lead 154 becomes now connected through contacting switch blades 143 and 144, lead 179, coin release solenoid 178, lead 177, connecting point 176, lead 157, connecting point 156 with main supply lead 155. Thus as the two blades 143 and 144 contact, the coin release solenoid becomes energized and causes the coin retained at 177 in Fig. 1 to drop into coin box 78. At the same time, the contact between blade 142 and 143 establishes direct connection from main lead 154 to terminal 165' of the motor through lead 174 connected with blade 142.

Thus, if any one of the doors is being tampered with, thereby causing an erratic operation of the door switches 91, current flow to motor terminal 165' is still assured through closed switch blades 142 and 143.

As now the revolution of the double cam continues, the higher cam 138 comes into engagement with switch lever 152 and depresses it more, thereby effecting contact between switch blades 145 and 146, and switch blades 147 and 148 by means of insulating blocks 149 and 150. The closing of contacts 147 and 148 establishes direct connection from main lead 155 to motor terminal 165, the closing of switch blades 145 and 146 introducing resistance 184 into the field winding of the motor, thereby causing a slowing-down of the motor speed.

As the rotation of double cam 136 continues, high cam 138 releases switch operating lever 152, thereby causing all of the switch blades of multiple switch 141 to automatically separate, thus cutting off the current supply to the motor, and the operation of the latter consequently stops. The machine is now ready for the next operating cycle when another coin is inserted into the machine.

*Wiring connections*

While in Fig. 33 a simple and understandable electric diagram is shown, although indicating only three tiers, that is the topmost tier T, any one of the intermediate tiers M and the lowermost tier L, it is to be understood that there is a greater number of tiers interposed between the topmost and lowermost tiers.

In order to simplify connection between the several tiers, and also to render the conveyer platforms of these tiers removable and the tiers below the uppermost tier exchangeable without the necessity of cutting wires and making new electrical connections, it is proposed to provide peripheral edge supports for the platforms at the interior wall of the cabinet (not shown) and to equip each platform with an electrical connector, such as shown in Figs. 1 and 29 at "CT" for the topmost tier, "CM" for any intermediate tier, and "CL" for the lowermost tier. Topmost connector "CT" is preferably provided with five prongs and all other connectors, "CM" and "CL" with four prongs. Obviously, these connectors are composed of male and female members which may be engaged or disengaged when any changes in location or replacement of platforms become necessary.

The exchange or replacement of the platforms is relatively simple, since each one of the platforms is self-contained as to its entire mechanical arrangement, with the exception of two elements, that is shaft 42 and switch-operating bar 43, whch serve all of the platforms. Shaft 42 is journaled in vertically aligned individual bushings lodged in each of the platforms, as can be clearly observed from Fig. 29.

These bushings have enlarged lower portions and reduced upper extensions which are fitted in suitably aligned apertures provided in the platforms. The bushings obviously are intended to rotate with the shaft within these apertures. Each of the bushings have set screws for engaging shaft 42.

The operating levers 42' for hook-shaped chain actuating elements 42" have enlarged hub ends also provided with set screws for engaging shaft 42.

When the exchange or replacement of any of the platforms is required it becomes necessary to loosen the set screws in the bushings and in the enlargements of levers 42', whereupon it is an easy matter to lift the platforms and remove them from within the casing of the machine.

The removal or replacement of the different platforms also requires the removal of switch-operating bar 43 illustrated in detail in Fig. 32. As will be seen in that figure the bar is guided within aligned bushings set from the top into the platforms. At the lowermost platform the bar is held in alignment within a bushing which is journaled in an opening within the lowermost platform. A collar opposite that bushing prevents the bar from slipping downwards. Both the bushing and the collar are provided with set screws for fastening them to bar 43.

When bar 43 is to be removed, the set screws of the bushing and of the collar are loosened and the bar is so positioned that its arms 54 pass through suitable slots provided in each of the platforms, as clearly illustrated in Fig. 2.

Having thus described the present invention, what is claimed as new is:

1. In a coin-controlled merchandise vending machine having a plurality of horizontal, superimposed like platforms, all of the platforms, except the uppermost platform, being interchangeable, the combination with endless, electro-mechanically actuated article conveyers operative upon each platform, of normally closed reciprocatingly movable, manually operable sliding doors, one for each conveyer, the operation of each door governing the operation of its respective conveyer, the doors serving, when open, to provide access to articles carried by their respective conveyers; an electric system of coin-releasable, codependent electro-magnetically controlled door latching means, one for each door, normally retained in a position to prevent the full opening of their respective doors, but permitting a very limited reciprocal door movement; a coin receiver; the deposit of a coin thereinto rendering the latching means of one of the doors releasable and that one door manually openable; means provided in the electric system and controlled by the operation of that one door for causing, when that door is opened, the latching means of all other doors to reassume their normal position, thus preventing these other doors from being fully opened.

2. In a coin-controlled merchandise vending machine having a plurality of horizontal, superimposed like platforms, all of which, except the uppermost platform, being interchangeable, the combination with a plurality of endless, superimposed conveyers operative upon said platforms, and electro-mechanical means for actuating the conveyers, of a plurality of normally closed doors, one for each conveyer, said doors controlling the operation of their respective conveyers and being adapted, when open, to provide access to articles carried by the respective conveyers; coin-releasable door latches, one for each door, normally retained in position to prevent the opening of the doors; electro-magnetic latch actuating means, one for each door latch; an electric system, including said conveyer and latch actuating means, a coin receiver, a coin retainer and coin releasing means, the latter controlled by and forming a part of the electric system; the deposit of a coin into the receiver energizing the electric system and causing the operation of the latch-actuating means of a selected door, whereby the door latch of that door is moved from its normal, door-closing position to a door-freeing position, while all of the other doors remain latched; the closing of that one open door causing its latch to reassume its normal position, whereby all of the doors of the machine are kept closed.

3. In a coin-controlled merchandise vending machine having a plurality of horizontal, superimposed platforms, all of which, except the uppermost platform, are interchangeable, the combination with an electro-mechanically actuated endless article conveyer operative upon each of the platforms, of a manually operable, reciprocally movable sliding door for each platform controlling, by its movement the operation of its respective conveyer, and normally covering an aperture which provides access to the conveyer for the removal of a single article therefrom at one time; an electro-magnetically controlled coin-releasable door latch normally engaging the door and preventing its movement to a fully open position, but permitting a slight reciprocal shifting of the door within very close limits, said latch disengaging the door and facilitating its movement to a fully open position when released by a coin.

4. In a coin-controlled merchandise vending machine including a normally fully closed cabinet, divided interiorly into superimposed tiers and an endless article conveyer operative on each tier; a normally closed sliding door for each tier to provide access to its conveyer when the door is opened; a coin-controlled electric system governing the operation of the doors and of the conveyers and including an electric motor and actuating means for the conveyers driven by the motor, said actuating means being adapted for individually operating any one of the conveyers whose respective door is first opened and then closed, said actuating means commencing operation only when the door is in its fully closed position, said actuating means comprising a single shaft and individual conveyer propeller means for each conveyer, all movable simultaneously by the shaft, but being releasable to their conveyer-propelling position only by the aforesaid manipulation of their respective doors.

5. In a vending machine, as in claim 4, each of said endless article conveyers constituting a link chain composed of main links and connecting links for the latter, said main links comprising peripheral, outwardly extending platforms having recesses at their interior edges, said recesses being adapted for engagement by said individual conveyer-propelling means.

6. In a vending machine as in claim 5, and wherein a fixed article container bottom reposes upon and is fixedly secured to said main link, an article container supported by and secured to said fixed bottom, and wherein each of the platforms and each of the container fixed bottoms have registering elongated perforations parallel with their exterior edge, said fixed container bottoms having rearwardly extending lugs, said platforms having upwardly directed loops adjacent to their interior, recessed edges, the lugs of said container bottoms engaging said loops, and an upwardly biased spring located between the loops and the perforations of each of said platforms.

7. In a vending machine as in claim 6, and wherein each article container supported by its respective platform comprises a three-wall structure open along the exterior edge of the platform and having a rear wall adjacent to the interior platform edge and two side walls, a mobile bottom within the container hingedly associated with the rear wall thereof, said upwardly biased spring of said platforms urging said mobile bottom of each container in upward direction, said mobile bottom having an elongated, downwardly directed ridge adapted to project through the registering perforations in the fixed container bottom and in the platform when the mobile bottom is depressed against said spring.

8. In a coin-controlled merchandise vending machine, a substantially fully closed cabinet containing a plurality of superimposed tiers, each tier having a conveyer-supporting platform, an endless article conveyer operative upon each platform, a normally closed door for each tier providing access to its corresponding conveyer when opened; the platforms of all tiers being bodily removable and all tiers beneath the topmost tier being interchangeable; coin-releasable electro-mechanical means governing the opening of the doors and the operation of their respective conveyers so that, upon the deposit of a coin into the machine, one of the doors can be manually opened while all other doors are prevented from opening, the closing of the opened door then causing said electro-mechanical means to actuate the corresponding conveyer so that the latter commences and completes a full operating cycle before any of the doors can be opened in response to the deposit of another coin into the machine.

9. In a vending machine of the type indicated, a sliding door, a mechanism for controlling the movement thereof and comprising a detent mounting forming a part of one door end and extending therefrom, a spring-loaded lever tensionally engaging said mounting and normally urging the door toward and keeping it in its closing position; a door detent projecting from and constituting an integral part of the mounting and having a depending switch-operating element; a normally open switch operable by said element; a door latch for and cooperating with said door detent, said door latch being normally in its inoperative position at which it restricts the detent, and thus the door, to a limited reciprocal movement; a solenoid for moving the latch to a detent-freeing or operative position when the solenoid becomes energized; said switch being held open when engaged by said element and, when released by the latter, closing an electric circuit for energizing said solenoid.

10. In a vending machine of the type indicated, an electric system, a plurality of superimposed tiers supporting endless article conveyers, one on each tier, said conveyers being operable independently of one another, one at a time; normally closed reciprocably movable sliding doors, one for each conveyer, controlling the operation of the latter and providing access thereto when open; an electrically operated actuating mechanism for the conveyers; electro-magnetic control and releasing means for each of the doors; coin-controlled means for governing the operation of said electric system, the latter in turn governing the operation of the control and releasing means for the doors and of the actuating mechanism, said electric system including means for effecting the operation of the one conveyer whose door is first fully closed and then opened, when freed by said releasing means and then released.

11. In a vending machine of the type indicated, a plurality of superimposed tiers supporting endless article conveyers, one on each tier, said conveyers being operable independently of one another, one at a time; normally closed sliding doors, one for each conveyer, providing access thereto when open; an actuating mechanism for the conveyers; control and releasing means for the doors; and a coin-controlled electric system for governing the operation of the doors and of the actuating mechanism, each conveyer comprising a link chain composed of platform-shaped main links and connecting links for the main links, the main links having engageable recesses at their interior edges, article containers carried by the main links, each container having a weight-depressible, normally upwardly biased article-supporting bottom equipped with means for actuating a weight-responsive switch when the bottom is depressed by a weight, such as the weight of an article placed in a container, said conveyer actuating mechanism comprising a motor-driven operating shaft serving all of the conveyers, an operating arm for each conveyer extending from the shaft, a chain-moving merchandise delivery hook for each conveyer and actuable by its corresponding operating arm in reciprocal substantially linear directions relative the link chain, a spring-loaded lever for each hook normally bearing against the latter and urging it toward its respective link chain, each hook having a cutout and a chain detent-engaging abutment; solenoid-actuated means for each hook controlling the positioning of the hook relative its link chain; a spring-loaded chain detent for each conveyer chain and normally engaging the recess of one of its chain links, thus preventing the movement of the conveyer, and being adapted to be brought to a chain-releasing position by the chain detent-engaging abutment of its respective hook when the latter is caused to move toward the detent; a starter or main switch-operating bar passing through all tiers and having above the uppermost tier a single switch-engaging arm and a plurality of bar-moving arms, one above each of the tiers; each of said spring-loaded levers bearing against their respective hooks having a pin normally engaging the bar-moving arm of its corresponding tier, spring means provided for the switch-operating bar for urging said bar-moving arms against said lever pins; a motor; a linkage connecting the latter with said operating shaft for imparting thereto and to said hook-operating arms oscillating movement, thus causing said hooks to reciprocate; and a two-stage switch-actuating cam driven by said motor for operating a multiple blade switch; said control and releasing means for the doors comprising for each door a switch-actuating door detent, a solenoid-operating door latch cooperating with the detent to either permit a limited movement thereof and of the door, or to clear the detent and thereby facilitating the full opening of the door, and a spring-loaded pressure lever tensionally engaging and constantly bearing against the detent to normally urge the door towards its closing position.

12. In a vending machine as in claim 11, said coin-controlled electric system including, as one unit for the entire machine, a coin detector and a coin rejector for defective coins; and comprising, also as one unit for the entire machine, a starter or main control switch located at the topmost tier, a coin-actuated switch for initially energizing the system, a coin return solenoid and a control switch for the latter, a multiple blade switch operated by said motor-driven two-stage cam, and a coin retention solenoid controlled by a pair of switch blades of said multiple blade switch; said system further comprising, as an individual unit for each tier, each conveyer and each door, a door latch solenoid, a delivery hook solenoid having an actuable armature, constituting said solenoid-actuated means and serving for releasing the hook to its operative position and into engagement with said link chain; an arrangement of three series-connected switches for energizing the delivery hook solenoid and the door latch solenoid, said series-connected switches consisting of a double throw, triple contact switch operable by the door detent, a weight-responsive switch closable by the weight of an article carried by the conveyer, and a third switch closable by the armature of the delivery hook solenoid; said triple contact switch comprising a central and two outer contacts; said door detent, tensionally urged by said pressure lever in a door-closing direction, normally causing the central contact to engage one of the outer contacts, and to assume a disengaging position relative the other outer contact; said door detent, when moved with the door in the direction toward the opening position of the door, causing the disengagement by the central contact of that one outer contact and the simultaneous engagement of the other outer contact by said central contact, thereby effecting, provided the coin-actuated switch and the weight-responsive switch of the respective doors are closed, the closing of a circuit for energizing the delivery hook solenoid, the armature of that solenoid then closing the third switch, thereby energizing the door latch solenoid; the latter, when thus energized, causing the door latch to release the door detent, thereby facilitating moving of the door to its fully open position.

13. In a vending machine as in claim 9, and wherein said door detent and said door latch are provided with coacting abutments which are responsible for restricting the door movement when the latch is in its normal, inoperative position, spring means provided for the door latch for tensionally urging it into that normal, inoperative position; said solenoid, when energized, moving the latch to its operative, detent-freeing position, thereby facilitating the manual operation of the door to its fully open position.

14. In a vending machine as in claim 13, and wherein said door has a resilient handle for operating it both within the limits defined by said coacting abutments, while the latch is in its inoperative position, and to the fully open position when the latch is brought to its operative position by the energized solenoid.

15. In a vending machine having a plurality of superimposed horizontal, substantially immovable tiers, of which all tiers but the topmost tier, are interchangeable, each tier having an endless conveyer guide and a merchandise conveyer operating therein, a sliding door for each tier providing, when open, the only access to its respective tier, conveyor-actuating means for each tier, a mechanism controlling the operation of the door and comprising means for either restricting the movement of the door to a limited reciprocal shifting action or freeing the door to permit its full opening, the operation of each door controlling the operation of its respective conveyer-actuating means so that the full closing of the door causes the conveyer-actuating means to complete one operating cycle, and a flexible door handle facilitating the manual operation of the door, but preventing straining of the door and of the mechanism controlling its operation.

16. In a control mechanism for sliding doors designed for vending machines of the type indicated, a door guide, a door frame mounted to slide within the guide, a detent support extending from the door frame and having an engageable surface, a spring-loaded pivoted pressure lever tensionally engaging said surface of the detent support; a door detent forming a continuation of said detent support and constituting an angular structure having a horizontal leg and a vertical leg depending from the horizontal leg, a corner enlargement at the juncture of the legs, the end of the vertical depending leg having a broadened extension, the corner enlargement having a vertical face adjacent said horizontal detent leg, said face forming one abutment for the detent, the outer surface of the vertical leg forming its other abutment; a door latch adapted for cooperation with said detent, spring means for the latch normally urging it to assume its inoperative, detent-engaging position, thereby restricting the operation of the detent to a limited reciprocal movement; said door latch comprising two hingedly associated parts, one of the parts having an abutment coacting with the abutment of the corner enlargement of the detent, the other part having an angular abutment coacting with the vertical leg of the detent; a triple contact switch engageable and operable by the broadened extension of the depending detent leg; and a solenoid energizeable by the operation of said switch and having an armature connected with one of the latch parts and serving for moving the latch to its inoperative, detent-disengaging position when the solenoid is energized, thus permitting the movement of the door to its fully open position.

17. In a vending machine having doors providing access to the interior of the machine when opened, a mechanism for controlling the operation of each door, said mechanism comprising a door detent integral with and extending from the door, a door latch cooperating with the detent and normally so engaging the latter, that the detent, and thus the door, can be moved manually to a limited extent only; a solenoid with a movable armature, the latter operatively connected with the door latch and being adapted, when the solenoid becomes energized, to move the door latch to a detent-releasing position, thereby facilitating operation of the door to its fully open position; spring-loaded door-engaging means normally urging the door toward and keeping it in its closed position; a switch controlling the operation of the solenoid and being actuated by the detent when the door is moved toward its opening position; said door detent and said door latch each having a pair of coacting abutments.

18. In a vending machine as in claim 17, and wherein said door detent is composed of a horizontal and a vertical leg, the latter depending from the horizontal leg, and forming therewith an angle structure, the end of the vertical leg having a broadened enlargement adapted for actuating the switch; a corner enlargement at the juncture of the two detent legs and having vertical and horizontal faces connected by an inclined face; the vertical face of the corner enlargement serving as one of the detent abutments, the outer face of the vertical leg constituting the other detent abutment.

19. In a vending machine according to claim 18, and wherein said door latch comprises a pivotally mounted structure composed of two parts interhinged with each other and coaxially with the pivotal point of the structure, a spring normally urging the two latch parts toward one another; one of the latch parts, designated as rear part, being removably connected with the solenoid armature and having a lug extending forwardly from its body, said lug having a horizontal and a vertical face, the latter face constituting one abutment of the door latch and coacting with the vertical face of the corner enlargement of the door detent, said rear latch part also having a forwardly directed stop pin for limiting the movement of the other latch part relative the rear latch part; that other latch part, designated as front part, constituting a vertical body portion from which extends a substantially horizontal ledge having a step-like end, said ledge cooperating with said stop pin, said step-like end having a vertical face constituting the other door latch abutment for cooperation with the outer face of the vertical detent leg.

20. In a coin-controlled merchandise vending machine according to claim 8, said electromechanical means comprising a motor and a single motor-driven shaft for actuating any one of the conveyers whose door is first fully opened and then closed.

21. In a coin-controlled merchandise vending machine according to claim 8, and wherein each of the conveyer platforms are provided with electrically controlled devices governing the operation of their respective doors and conveyers, and wherein said devices of each interchangeable platform are wired independently from the devices of all other platforms, a multiple-contact connector comprising cooperating male and female elements, one of the elements being fixedly associated with each platform; the leads from said devices of each platform being connected with the contacts of said one element, the other element being removably associable with said one element and having corresponding contacts, and corresponding leads extending from said other element and serving for electrically interconnecting said devices of all platforms and connecting them with the electromechanical means governing the opening of the doors and the operation of the conveyers.

22. In a coin-controlled merchandise vending machine, a normally fully closed cabinet, a plurality of superimposed tiers within the cabinet, an endless conveyer guide at each tier, an endless article conveyer operative in the guide of each tier, a main door for the cabinet, a single coin receiver and a plurality of tier doors, one for each tier, operatively mounted in said main door, an electrically controlled actuating device for each conveyer, a single, electrically controlled mechanism for individually operating the actuating device of any one of the conveyers; an electric door switch for each tier door, a door detent provided with each tier door and being adapted to operate said door switch, an electrically controlled door latch cooperating with the detent, one latch for each tier door, said door switch and said door latch governing the door operation; an electric system connecting all of the electric and electrically controlled instrumentalities and so governing their relative functions that when one of the tier doors is opened, in response to the deposit of a coin in the coin receiver, all other doors are held closed, and, upon closing of that opened tier door said mechanism becomes energized and causes the operation of the conveyer actuating device of that tier whose door was operated.

23. In a vending machine as in claim 22, and wherein each of said tier doors have a detent support, a door detent extending therefrom, a solenoid-controlled door latch cooperating with the door detent, a double-throw triple-contact switch operative by said door detent, said switch controlling the operation of said door latch and thus the opening of the door; spring-loaded means for normally urging the door to its closing position, thereby causing the door detent to operate the switch in one direction; said door detent causing the operation of the switch in opposite direction when the door is moved towards its opening position against the force of said spring-loaded means.

24. In a vending machine as in claim 22, and wherein each of said tier doors have a detent support, a door detent extending therefrom, a solenoid-controlled door latch cooperating with the door detent, a double-throw triple-contact switch operative by said door detent, said switch controlling the operation of said door latch and thus the opening of the door; spring-loaded means for normally urging the door to its closing position, thereby causing the door detent to operate the switch in one direction; said door detent causing the operation of the switch in opposite direction when the door is moved towards its opening position against the force of said spring-loaded means, and wherein said door detent comprises an angular structure composed of horizontal and vertical legs provided with a corner enlargement having vertical abutment and horizontal faces connected by a slanting face; said vertical leg having an enlarged end portion adapted to actuate said switch.

25. In a vending machine as in claim 22, and wherein each of said tier doors have a detent support, a door detent extending therefrom, a solenoid-controlled door latch cooperating with the door detent, a double-throw triple-contact switch operative by said door detent, said switch controlling the operation of said door latch and thus the opening of the door; spring-loaded means for normally urging the door to its closing position, thereby causing the door detent to operate the switch in one direction; said door detent causing the operation of the switch in opposite direction when the door is moved towards its opening position against the force of said spring-loaded means, and wherein said door detent comprises an angular structure composed of horizontal and vertical legs provided with a corner enlargement having vertical abutment and horizontal faces connected by a slanting face; said vertical leg having an enlarged end portion adapted to actuate said switch, and wherein said door latch comprises two pivotally connected members, a spring urging them normally toward one another; said members having abutment cooperating with the abutment and slanting and horizontal faces of said corner enlargement and with the outer face of said vertical leg.

26. In a vending machine as in claim 22, and wherein each of said tier doors has a detent support, a door detent extending therefrom, a solenoid-controlled door latch cooperating with the door detent, a double-throw triple-contact switch operative by said door detent, said switch controlling the operation of said door latch and thus the opening of the door; spring-loaded means for normally urging the door to its closing position, thereby causing the door detent to operate the switch in one direction; said door detent causing the operation of the switch in opposite direction when the door is moved towards its opening position against the force of said spring-loaded means, and wherein said door detent comprises an angular structure composed of horizontal and vertical legs provided with a corner enlargement having vertical abutment and horizontal faces connected by a slanting face; said vertical leg having an enlarged end portion adapted to actuate said switch, and wherein said door latch comprises two pivotally connected members, a spring urging them normally toward one another; said members having abutments cooperating with the abutment and slanting and horizontal faces of said corner enlargement and with the outer face of said vertical leg, and wherein said door latch is normally retained by gravity in its inoperative, door detent-engaging position; a solenoid armature operatively connected with one of the latch members, and being adapted, when its solenoid is energized by the switch through the movement of the detent in a door-opening direction, to move the latch to its operative, detent releasing position, thus facilitating the movement of the door to its fully open position.

27. In a coin-controlled merchandise vending machine, a normally fully closed cabinet, a plurality of superimposed article-carrying tiers in the cabinet, a main door for the cabinet extending along substantially its full height, and a plurality of individual doors, one for each tier, operatively associated with the main door, and wherein endless article conveyers are operatively supported upon the tiers, and wherein a single operating mechanism serving all of the conveyers is located in the cabinet; and wherein said individual doors have individual control means governing their opening; and an electric system connecting the door control means of all doors and said operating mechanism so that when the door of one of the tiers is opened, all other doors are prevented from opening, and, when the opened door is closed, said mechanism becomes energized and actuates the conveyer of the tier whose door was operated.

References Cited in the file of this patent

UNITED STATES PATENTS

| | | |
|---|---|---|
| 164,812 | Crane | June 22, 1875 |
| 570,534 | Bente | Nov. 3, 1896 |
| 1,403,599 | Goudeau | Jan. 17, 1922 |
| 1,766,717 | Miller | June 24, 1930 |
| 1,885,324 | Bjornson | Nov. 1, 1932 |
| 1,949,039 | Clauson | Feb. 27, 1934 |
| 2,016,127 | Weiler | Oct. 1, 1935 |
| 2,058,726 | Schreiber | Oct. 27, 1936 |
| 2,104,497 | Schulte | Jan. 4, 1938 |
| 2,131,067 | Paden | Sept. 27, 1938 |
| 2,269,164 | Rinehart | Jan. 6, 1942 |
| 2,282,164 | Buswell | May 5, 1942 |
| 2,359,183 | Wilsey | Sept. 26, 1944 |
| 2,423,207 | Sharp | July 1, 1947 |
| 2,423,265 | Stewart | July 1, 1947 |
| 2,573,112 | Schneckenburger | Oct. 30, 1951 |
| 2,599,173 | Hamilton | June 3, 1952 |
| 2,640,574 | Frankle | June 2, 1953 |

FOREIGN PATENTS

| | | |
|---|---|---|
| 343,918 | Great Britain | Feb. 23, 1931 |